United States Patent [19]
Hori et al.

[11] Patent Number: 5,779,176
[45] Date of Patent: Jul. 14, 1998

[54] WEBBING TAKE-UP DEVICE

[75] Inventors: Seiji Hori; Yasuho Kitazawa; Sumikazu Sasaki; Keiichi Kato; Naohiro Tsukiyama; Kenji Matsui, all of Aichi-ken, Japan

[73] Assignee: Kabushiki Kaisha Tokai-Rika-Denki-Seisakusho, Japan

[21] Appl. No.: 634,823

[22] Filed: Apr. 19, 1996

[30] Foreign Application Priority Data

Oct. 16, 1995 [JP] Japan ................................. 7-267509
Mar. 19, 1996 [JP] Japan ................................. 8-062910

[51] Int. Cl.$^6$ .................. B65H 75/48; B60R 22/28; B60R 22/34
[52] U.S. Cl. .................. 242/379.1; 242/384; 280/805; 280/806; 280/807
[58] Field of Search ................. 242/379.1, 384, 242/396.1, 396.4; 280/805, 806, 807; 297/472, 475

[56] References Cited

U.S. PATENT DOCUMENTS

| | | | |
|---|---|---|---|
| 3,561,690 | 2/1971 | Muskat | 242/379.1 |
| 4,323,205 | 4/1982 | Tsuge et al. | 280/805 X |

FOREIGN PATENT DOCUMENTS

| | | |
|---|---|---|
| 1913448 | 9/1970 | Germany. |
| 50-100218 | 3/1975 | Japan. |
| 54-100419 | 7/1979 | Japan. |
| 58-108856 | 7/1983 | Japan. |
| 1145760 | 10/1989 | Japan. |
| 1335807 | 10/1973 | United Kingdom. |

OTHER PUBLICATIONS

Search Report, European Patent Office.

*Primary Examiner*—John Q. Nguyen
*Attorney, Agent, or Firm*—Sixbey, Friedman, Leedom & Ferguson, PC; Thomas W. Cole

[57] ABSTRACT

There is provided a webbing take-up device in which a load required to rotate a spool in a webbing drawing direction with reference to a shaft is stabilized in the process of rotating the spool, a stable load can be achieved with small deformation, and miniaturization can be achieved. In an ordinary state, an EA plate keeps its original shape, and the shaft and spool are rotated together with each other. When the shaft is prevented from being rotated in the webbing drawing direction in vehicle sudden deceleration, the EA plate is plastically deformed by a webbing drawing force, and the EA plate is pushed in an internal-angle portion of the spool with rotation of the spool in the webbing drawing direction with reference to the shaft. The EA plate is bent by a U-shaped portion and then wound around the outer periphery of the shaft. The other end portion of the EA plate is pushed into the internal-angle portion at a winding start end portion of the EA plate around the shaft to prevent the subsequential rotation of the spool in the webbing drawing direction with reference to the shaft. Thus, when the webbing is prevented from being drawn, the webbing is drawn by a predetermined length, and energy absorption can be achieved.

20 Claims, 21 Drawing Sheets

WEBBING TAKE-UP DEVICE

BACKGROUND OF THE INVENTION

1. Field of the Invention

The present invention relates to a webbing take-up device capable of allowing a webbing to be drawn when the webbing is prevented from being drawn, thereby absorbing energy.

2. Description of the Related Art

In the webbing take-up device, rotation of a spool in a webbing drawing direction is locked in vehicle sudden deceleration to prevent the webbing from being drawn. When the webbing is prevented from being drawn, energy absorption is planned.

For example, a spool and a rotating member are arranged, and are ordinarily rotated together with each other. However, when rotation of the rotating member in a webbing drawing direction is prevented in vehicle sudden deceleration, the spool is designed to be rotated in the webbing drawing direction with reference to the rotating member by a webbing drawing force.

For this purpose, a device having the following arrangement is developed. The spool moves in the axial direction with rotation in the webbing drawing direction, and a plastic deformation member is deformed by the movement in the axial direction.

However, with the movement in the axial direction, the device increases in size in the axial direction. On the other hand, a device using plastic deformation such as tension, compression, or torsion is developed. However, in such plastic deformation, a load is unstable in the process of plastic deformation, and a larger amount of deformation is required to obtain a predetermined load. In addition, the device using the plastic deformation is large in size.

In the plastic deformation, not small elastic deformation disadvantageously occurs.

Japanese Utility Model Application Laid Open (JP-U) No. 50-100218 discloses an energy absorption type seat belt retractor having an arrangement in which a gear portion which is prevented from being rotated in vehicle collision is rotatably connected to a side portion of a seat belt take-up shaft for taking up a seat belt, and an iron plate serving as an energy absorbing member having one end fixed to the seat belt take-up shaft and other end fixed to the gear portion is arranged between the seat belt take-up shaft and the gear portion to have a roll shape, so that, when the gear portion is prevented from being rotated in collision, the roll-shaped iron plate is wound around the shaft with rotation of the seat belt take-up shaft to absorb energy.

Japanese Utility Model Application Laid Open (JP-U) No. 56-1924.5 (corresponding to U.S. Pat. No. 4,323,205), as in the above-said Japanese Utility Model Application Laid Open No. 50-100218, discloses a seat belt take-up device in which a gear portion which is prevented from being rotated in vehicle collision is rotatably connected to a side portion of a seat belt take-up shaft, and one end of a take-up member serving as an energy absorbing member is; connected to the seat belt take-up shaft. A folding-back pin for folding back the taken-up member is arranged in the gear portion. For this reason, when the gear portion is prevented from being rotated in collision, with rotation of the seat belt take-up shaft, the taken-up member is wound around the shaft while being folded back by the folding-back pin, thereby absorbing energy.

However, in each of the two Japanese Utility Model Application Laid Opens, the gear portion which is prevented from being rotated in vehicle collision is connected to the side portion of the seat belt take-up shaft. Therefore, the same problem as described above is posed, i.e., the device increases in size in the axial direction of the shaft.

SUMMARY OF THE INVENTION

In consideration of the fact, it is a first object of the present invention to provide a webbing take-up device which is designed to decrease in size.

It is a second object of the present invention to provide a webbing take-up device in which a load required to rotate a spool in a webbing drawing direction with reference to a shaft can be stabilized in the process of rotating the spool, or the load required to rotate the spool in the webbing drawing direction with reference to the shaft can be reduced in the process of rotating the spool, a stable load can be obtained with a small amount of deformation, and miniaturization can also be achieved.

In order to achieve the first object, according to a first aspect of the present invention, there is provided a webbing take-up device comprising a cylindrical spool which can freely draw and take up a webbing, a shaft, arranged in the cylinder of the spool, which can be freely rotated with reference to the spool, and an energy absorbing member arranged between the spool and the shaft, having one end engaged with the shaft and the other end engaged with the spool, keeping its original shape in an ordinary state to rotate the spool and the shaft together with each other, and, when the shaft is prevented from being rotated in a webbing drawing direction, deformed by relative rotation between the spool and the shaft on the basis or a webbing drawing force acting on the spool.

According to a second aspect of the present invention, the webbing take-up device in the first aspect comprises stopper means for regulating an amount of rotation of the spool in a webbing drawing direction with reference to the shaft.

In order to achieve the second object of the present invention, according to the third aspect of the present invention, there is provided a webbing take-up device comprising a cylindrical spool which can freely draw and take up a webbing, a shaft, coaxially arranged in the cylinder of the spool, which can freely rotated with reference to the spool, lock means for preventing the shaft from being rotated in a webbing drawing direction, and a plate-like member arranged between the shaft and the spool, having one end engaged with the shaft, wound around the outer periphery of the shaft between the inner periphery of the spool and the shaft from the one end side by rotation of the spool in the webbing drawing direction, required to be bent before the plate-like member is wound around the outer periphery of the shaft, keeping its original shape in an ordinary state to rotate the spool and the shaft together with each other, and, when the shaft is prevented from being rotated in the webbing drawing direction, deformed by a webbing drawing force acting on the spool to be wound around the shaft.

Note that the arrangement of the third aspect can comprise stopper means for regulating an amount of rotation of the spool in the webbing drawing direction with reference to the shaft.

According to the fourth aspect, in the webbing take-up device of the third aspect, a cavity portion is formed between the inner periphery of the spool and the outer periphery of the shaft, in order to bent the plate-like member before the plate-like member is wound around the shaft, the plate-like member is arranged in the cavity portion such that the plate-like member is bent to have a U shape, and the other end of the plate-like member is located in an internal-angle portion formed in the spool, and pushed in the internal-angle portion by rotation of the spool in the webbing drawing direction with reference to the shaft, to wind said plate-like member around the shaft.

According to the fifth aspect of the present invention, in the webbing take-up device of the third aspect, in order to bend the plate-like member before the plate-like member is wound around the shaft, a winding path for making the plate-like member winding is formed in the wall thickness of the spool.

According to the sixth aspect of the present invention, in the webbing take-up device of the third aspect, in order to bend the plate-like member before the plate-like member is wound around the shaft, a U-shaped path for causing the plate-like member to pass through the U-shaped path to have a U shape is formed in the wall thickness of the spool.

According to the seventh aspect of the present invention, the webbing take-up device of the fourth aspect comprises stopper means for regulating rotation of the spool in the webbing drawing direction with reference to the shaft, wherein the stopper means is arranged in such a manner that, when the other end portion of the plate-like member is bent before the plate-like member is wound the shaft, the other end portion is brought into contact with a winding start end portion of the plate-like member to be pushed into the internal-angle portion of the spool, thereby preventing the spool from being rotated in the webbing drawing direction with reference to the shaft.

According to the eighth aspect of the present invention, a webbing take-up device according any one of the third to sixth aspects comprises stopper means for regulating an amount of- rotation of the spool in the webbing drawing direction with reference to the shaft, wherein the stopper means comprises a mobile member arranged between the spool and the shaft, which can move in the axial direction of the spool and the shaft, moving means for moving the mobile member with rotation of the spool in the webbing drawing direction with reference to the shaft, and regulating means for regulating an amount of movement of the mobile member to regulate an amount of rotation of the spool in the webbing drawing direction with reference to the shaft.

According to the ninth aspect of the present invention, in the webbing take-up device of the fourth aspect, the other end portion of the plate-like member is bent to protrude toward a shaft side.

According to the tenth aspect of the present invention, in a webbing take-up device according to any one of the third to sixth aspects, the plate-like member has an area which is gradually changed from one end of the plate-like member to the other end of the plate-like member.

According to the eleventh aspect of the present invention, the webbing take-up device of the fourth aspect comprises fitting means, arranged between the spool and the shaft and fitted on each other with a briskly fitting force, for making it possible to perform alignment between the spool and the shaft around the axis of the spool and the shaft and for, in order to locate the other end portion of the plate-Like member in the internal-angle portion regardless of the length of the plate-like member, making it possible to perform alignment between the spool and the shaft at a plurality of positions depending on the length of the plate-like member.

According to the twelfth aspect of the present invention, the webbing take-up device of the third aspect comprises a frame having a lower portion supported by and attached to a vehicle body and having an upper portion on which the shaft is supported, which, when the webbing is drawn upward from the spool, receives a torque around an axis parallel to the axial direction of the shaft and passing through a support point between the vehicle body and the frame in a webbing full drawing state, the lock means constituted by lock teeth formed on the frame and a lock pawl formed on the shaft and engaged with the lock teeth to prevent rotation of the shaft in the webbing drawing direction, and rupture means interposed between the frame and the shaft, ruptured with a webbing drawing force which does not rotate the frame to move the shaft with reference to the frame in a direction perpendicular to the axial direction of the shaft together with the spool, thereby engaging the lock pawl with the lock teeth.

According to the first aspect, in an ordinary state, the energy absorbing member keeps its original shape, the shaft and the spool are rotated together with each other, and the webbing can be freely drawn and taken up.

When the lock means operates in vehicle sudden deceleration to prevent the shaft from being rotated in the webbing drawing direction, the drawing force of the webbing applies a torque in the webbing drawing direction with reference to the shaft to the spool. Therefore, the energy absorbing member deforms with rotation of the spool in the webbing drawing direction with reference to the shaft.

When the webbing is prevented from being drawn, energy absorption can be achieved.

The energy absorbing member is interposed between the spool and the shaft, and is deformed by the rotation of the spool in the webbing drawing direction with reference to the shaft, and the spool need not be moved in the axial direction. For this reason, the device can be decreased in size.

According to the second aspect of the present invention, by providing the stopper means for regulating an amount of rotation of the spool in the webbing drawing direction with reference to the shaft, after the spool is rotated by a predetermined amount in the webbing drawing direction with reference to the shaft, thereby drawing the webbing by a predetermined length, the spool is prevented from being rotated in the webbing drawing direction with reference to the shaft and subsequently, the webbing is prevented from being drawn. Thus, the webbing is drawn by a predetermined length.

According to the arrangements of the third to twelfth aspects, the following function and effect can be obtained.

More specifically, in an ordinary state, the plate-like member keeps its original shape, the shaft and the spool are rotated together with each other, and the webbing can be freely drawn and taken up.

For example, when the lock means operates in vehicle sudden deceleration to prevent the shaft from being rotated in the webbing drawing direction, the drawing force of the webbing applies a torque in the webbing drawing direction with reference to the shaft to the spool. Therefore, the plate-like member cannot keep its original shape to be deformed, and, with the rotation of the spool in the webbing drawing direction with reference to the shaft is wound around the outer periphery of the shaft.

In this manner, energy absorption can be achieved.

In this case, the plate-like member need be plastically bent before the plate-like member is wound around the shaft, and this bending For(e mainly corresponds to a force required for rotation of the spool in the webbing drawing direction with reference to the shaft. According to the bending deformation in the bending process, a toad is stabilized in the deformation process, and a stable load can be achieved with a small amount of deformation.

The plate-like member can be incorporated in the spool between the shaft and the spool, thereby decreasing the device in size.

Note that the stopper means for regulating an amount of rotation of the spool in the webbing drawing direction with reference to the shaft can be arranged.

According to this, when the spool is rotated by a predetermined amount in the webbing drawing direction with reference to the shaft to draw the webbing by a predetermined length, the spool is prevented from being rotated in the webbing drawing direction with reference to the shaft. Subsequently, the webbing is prevented from being drawn, and thus the webbing is drawn by a predetermined length.

In order to bend the plate-like member before the plate-like member is wound around the shaft, as in the fourth aspect, in the arrangement in which the plate-like member is bent to have a U shape and arranged in the cavity portion, the plate-like member is pushed by the internal-angle portion of the spool with the rotation of the spool in the webbing drawing direction with reference to the shaft to be wound around the shaft.

In order to bend the plate-like member before the plate-like member is wound around the shaft, in the arrangement in which as in the fifth aspect, a winding path for causing the plate-like member to be winding is formed in the wall thickness of the spool, or as in the sixth aspect, a U-shaped path for causing the plate-like member to pass in the U-shaped form is formed in the wall thickness of the spool, the plate-like member is pushed by the portion of the winding path and the portion of the U-shaped path due to a webbing drawing force applied to the spool, and the plate-like member passes through the winding path and U-shaped path while being plastically bent, and is wound around shaft.

In the arrangement in which the plate-like member is pushed by the internal-angle portion of the spool to be wound around the shaft, in order to regulate the amount of rotation of the spool in the webbing drawing direction with reference to the shaft, the construction as in the seventh aspect is possible in which the other end portion of the plate-like member is pushed into the internal-angle portion of the spool at the start end of winding of the plate-like member around the shaft, and a so-called constipation state is set, so that subsequently, the spool can be prevented from being rotated in the webbing drawing direction with reference to the shaft. Even if such a so-called constipation state is not set, as in the eighth aspect, when an amount of movement of the moving member which moves with rotation of the spool in the webbing drawing direction with reference to the shaft is regulated, an amount of rotation of the spool in the webbing drawing direction with reference to the shaft can be regulated.

The arrangement, according to the eighth aspect, in which an amount of movement of the moving member which moves with rotation of the spool in the webbing drawing direction with reference to the shaft is regulated is applied to regulate an amount of rotation of the spool in the webbing drawing direction with reference to the shaft when the winding path and U-shaped path are formed in the wall thickness of the spool.

As the arrangement in which, in order to regulate an amount of rotation of the spool in the webbing drawing direction with reference to the shaft, the other end portion of the plate-like member is pushed into the internal-angle portion of the spool at the start end of winding of the plate-like member around the shaft, the arrangement as in the ninth aspect, in which the other end portion of the plate-like member is bent to project toward the shaft side, more specifically, the other end portion of the plate-like member is bent toward the shaft side to have a V shape, or the other end portion of the plate-like member is bent toward the shaft side to have a U shaped can be used. According to this arrangement, the amount of rotation of the spool in the webbing drawing direction with reference to the shaft can be regulated at a high accuracy.

In the winding of the plate-like member around the shaft, a frictional force caused by the reaction force of the plate-like member between the plate-like member and the spool or the like increases with an increase in an amount of winding of the plate-like member around the shaft. For this reason, a load required to rotate the spool in the webbing drawing direction with reference to the shaft tends to increase with rotation of the spool in the webbing drawing direction with reference to the shaft. As in the tenth aspect, when the arrangement in which the area of the plate-like member is gradually changed from one end to the other end, more specifically, the plate-like member is decreased in width from one end to the other end, or an opening having an area increasing from one end to the other end is formed in the plate-like member is used, the frictional force caused by the reaction force of the plate-like member between the plate-like member and the spool or the like can be prevented from increasing even if the amount of winding of the plate-like member around the shaft is increased. Therefore, a load required to rotate the spool in the webbing drawing direction with reference to the shaft can be stabilized or gradually decreased in the process of rotation of the spool in the webbing drawing direction with reference to the shaft. In addition, if the plate-like member has a portion which decreases in area between one end of the plate-like member and the other end thereof, the load required to rotate the spool in the webbing drawing direction with reference to the shaft can be decreased in part of the process of rotating the spool in the webbing drawing direction with reference to the shaft.

In the arrangement in which the other end of the plate-like member is located at the internal-angle portion of the spool, in order to arrange the plate-like member at a predetermined position between the spool and the shaft, positional alignment around the axis between the shaft and the spool is required. For this reason, as in the eleventh aspect, the positional alignment between the spool and the shaft is performed such a manner that the fitting means are fitted on each other between the spool and the shaft. When the spool is rotated in the webbing drawing direction with reference to the shaft, the fitting means is ruptured due to the torque of the spool, and the spool can be smoothly rotated in the webbing drawing direction with reference to the shift.

In case that the arrangement in which, in order to regulate the amount of rotation of the spool in the webbing drawing direction with reference to the shaft, the other end portion of the plate-like shape is pushed into the internal-angle portion of the spool at the start end of winding of the plate-like member around the shaft. is used, the amount of rotation of the spool in the webbing drawing direction with reference to the shaft corresponds to the length of the plate-like member. Depending on a desired drawing amount of the webbing, the length of the plate-like member is determined. As in the eleventh aspect, in order to locate the other end of the plate-like member having various lengths at the internal-angle portion of the spool, the positional alignment between the spool and the shaft can be made possible at a plurality of positions depending on the length of the plate-like member. Thereby, the spool and the shaft can be commonly used in many arrangements.

According to the arrangement in which the shaft which can be rotated with reference to the spool is arranged in the cylinder of the spool, the stopper portion of the webbing to the spool is located out of the axis of the spool to assure the space of the stopper portion in the wall thickness of the spool. In this case, when the webbing is stretched upward when the webbing is fully drawn, the webbing is bent through the outer periphery of the spool to have a V shape, and a load F1 acts on the spool at its bending point on the basis of the webbing drawing force.

The drawing force of the webbing applies a torque to a frame around an axis passing through a support point between the frame and a vehicle body.

When the spool can be freely rotated with respect to the frame, and the frame is rotated to keep the balance between the frame and the webbing drawing force, the spool is rotated with reference to the frame to keep its posture, and the webbing bent through the outer periphery of the spool to have the V shape is kept, and the load F1 is kept acting on the spool at the bending point on the basis of the webbing drawing force.

In the arrangement according to the twelfth aspect, the webbing drawing force which cannot rotate the frame moves the shaft in the direction (radial direction) perpendicular to the axial direction with reference to the frame, thereby preventing the shaft from being rotated in the webbing drawing direction. When the webbing drawing force increases in magnitude, and the frame is rotated to keep the balance between the frame and the webbing drawing force, the shaft and the spool are not rotated with reference to the frame, and change in their postures together with the frame. For this reason, the webbing is bent through the outer periphery of the spool to have a V shape before the rotation of the frame. However, after the rotation of the frame, unless the spool is rotated with reference to the frame, the webbing is straight through the outer periphery of the spool. The load F1 acting on the spool by bending the webbing through the outer periphery of the spool to have a V shape, based on the webbing drawing force, is eliminated.

In this case, a rotation moment acting on the spool around the axis thereof based on the webbing drawing force opposes a rotation moment, acting on the spool around the axis thereof at the internal-angle portion of the apool, based on the deforming force (as far as the original shape is kept) of the plate-like member required for rotation of the spool in the webbing drawing direction with reference to the shaft. As far as this opposition state is kept, the spool can keep the position thereof where the webbing is straight without being bent through the peripheral surface of the spool to have a V shape, and the load F1 acting on the spool based on the webbing drawing force is zero or reduced. It suffices that the spool has a proper strength.

The above and other objects, features and advantages of the present invention will become apparent from the following description and the appended claims, taken in conjunction with the accompanying drawings in which preferred embodiments of the present invention are shown by way or illustrative example.

BRIEF DESCRIPTION OF THE DRAWINGS

The invention will now be described with reference to the accompanying drawings wherein.

DESCRIPTION OF THE PREFERRED EMBODIMENTS

A webbing take-up device according to a first embodiment of the present invention will be described below with reference to FIGS. 1 to 7. Referring to FIGS. 1 to 7, the forward direction of a vehicle is indicated by an arrow FR, the direction of width of the vehicle is indicated by an arrow W, and the upward direction of the vehicle is indicated by an arrow UP.

Figure 1:
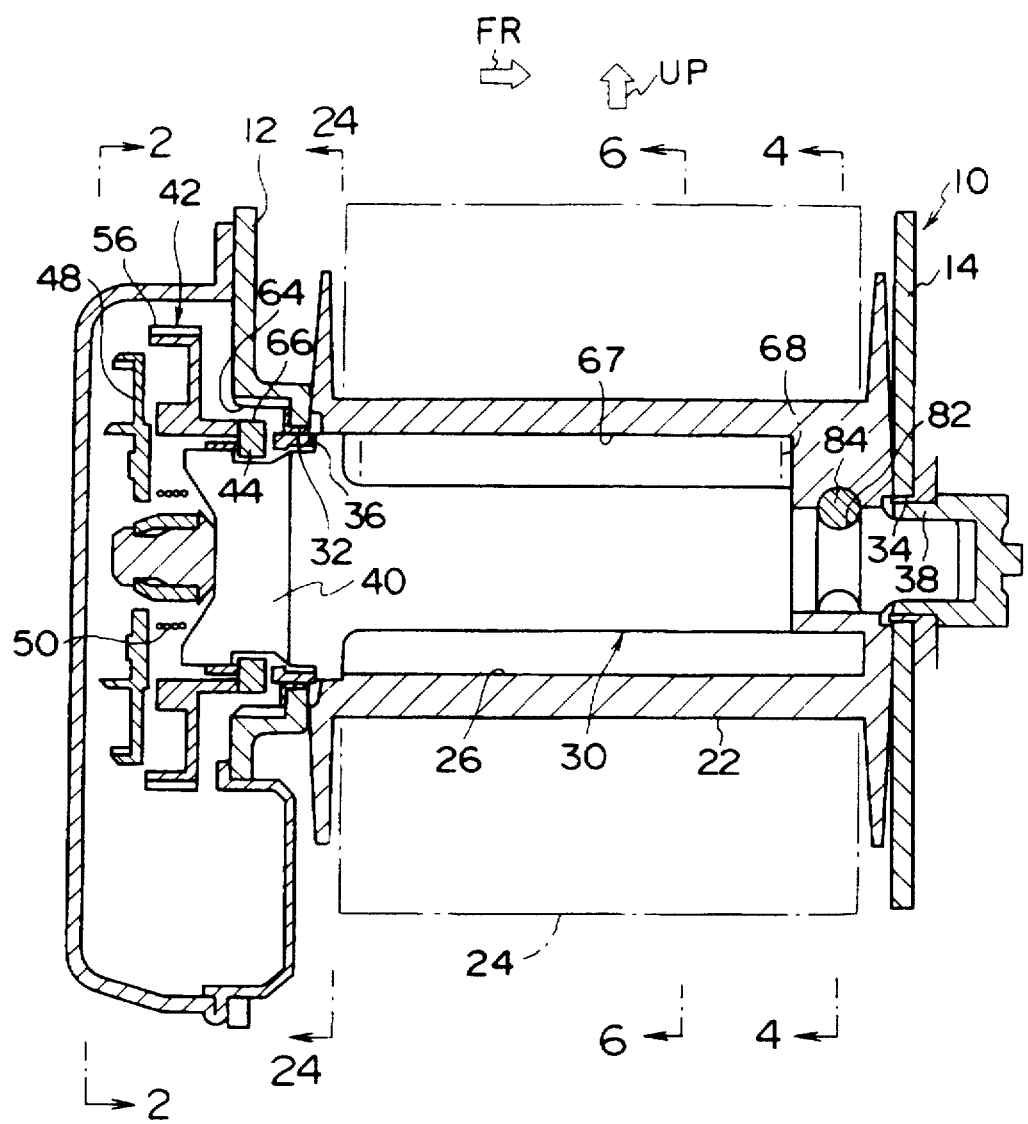
FIG. 1 is a view showing a webbing take-up device according to a first embodiment of the present invention when viewed along the axial direction of a shaft.
Figure 2:
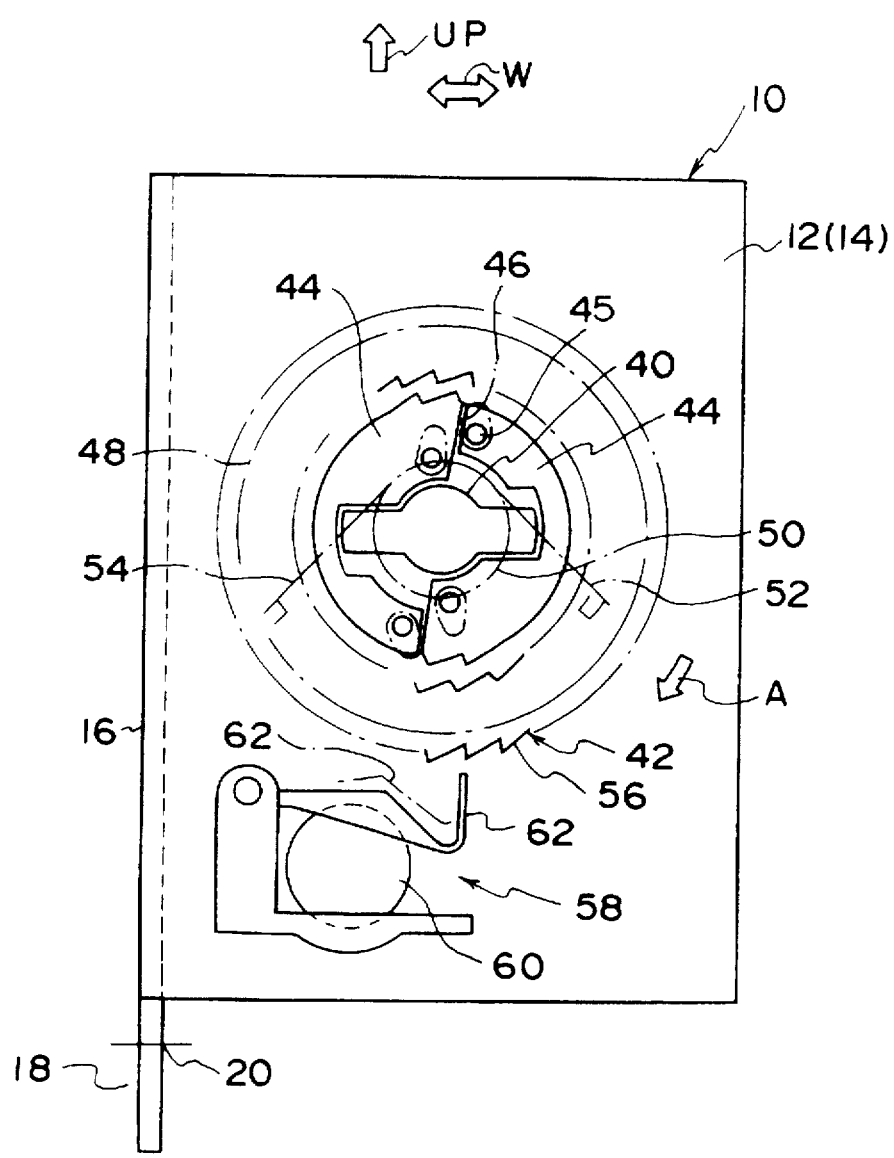
FIG. 2 is a view showing the webbing take-up device along a 2—2 line in FIG. 1.

As shown in FIGS. 1 and 2, a frame 10 has a pair of leg pieces 12 and 14 which oppose each other in the forward/ backward direction of the vehicle and a back piece 16 arranged between the leg pieces 12 and 14, and is formed to have a U shape. The back piece 16 extends downward, and the extended portion of the back piece 16 is supported (support point is indicated by 20 in FIG. 2) such a manner that the extended portion is fixed to the vehicle body 18 with a bolt. In this manner, the frame 10 is attached to the back piece 16.

Figure 6:
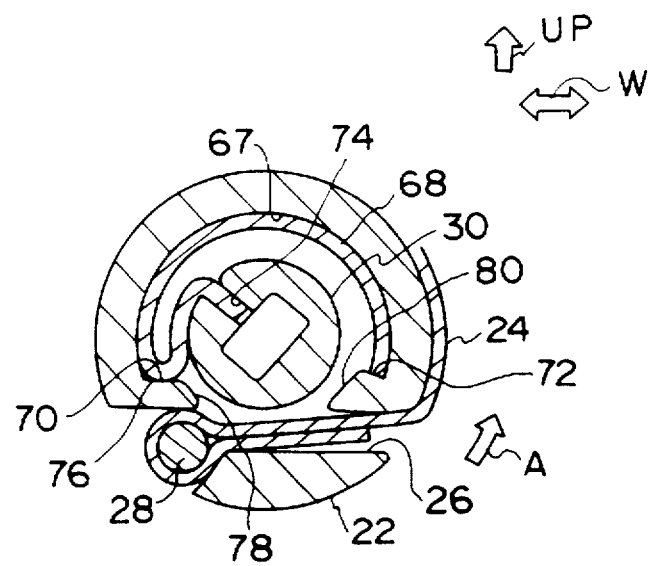
FIG. 6 is a view showing the webbing take-up device along a 6—6 line in FIG. 1.

A spool 22 is arranged between the leg pieces 12 and 14 to have an axial direction which is the same as the opposing direction of the leg pieces 12 and 14, and one end of a webbing 24 is engaged with the spool 22. With rotation of the spool 22, the webbing 24 can be freely drawn and taken up with respect to the spool 22. The drawing direction of the webbing 24 is indicated by an arrow A. As shown in FIG. 6, one end portion of the webbing 24 is inserted into a webbing engagement groove hole 26 formed in the spool 22 from one side of the webbing engagement groove hole 26, and the webbing 24 is folded around a webbing stopper shaft (stopper portion) 28 arranged at the other side of the webbing engagement groove hole 26 and overlaps each other in the webbing engagement groove hole 26, thereby preventing the webbing 24 from being drawn from the webbing engagement groove hole 26.

Figure 3:
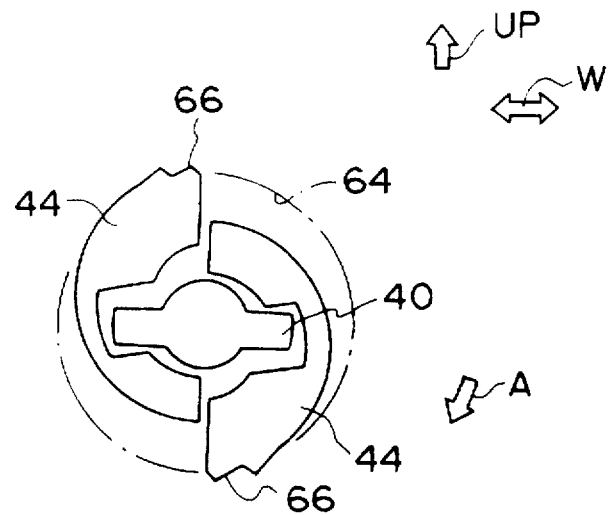
FIG. 3 is a view showing a lock state of the shaft and corresponding to FIG. 2.

The spool 22 has a cylindrical shape, and a shaft 30 is arranged in the cylinder such that the spool 22 and the shaft 30 have the same axis. The shaft 30 slidably supports the spool 22 at both the end portions, so that the spool 22 can be freely rotated. Both the ends of the shaft 30 are supported, through adapters 36 and 38, in the openings 32 and 34 formed in the leg pieces 12 and 14, so that the shaft 30 can be freely rotated. A projection shaft 40 projecting out of the leg piece 12 through the opening 32 is arranged on one end face of the shaft 30, and the projection shaft 40 is rotated together with the shaft. A V gear 42 is fitted on the projection shaft 40, and the V gear 42 can be freely rotated with reference to the shaft 30. A pair of lock plates 44 are interposed between the V gear 42 and the end face of the shaft 30. A pin 45 and a pin groove 46 are formed between the lock plates 44 and the V gear 42. With the pin 45 fitted in the pin groove 46, when the V gear 42 is rotated in a webbing drawing direction with reference to the shaft 30, the lock plates 44 an be moved in a direction in which the diameter increases, as shown in FIG. 3.

A lock pawl 66 is formed at the outer end of each of the lock plates 44, and lock teeth 64 serving as internal teeth are formed in the leg piece 12 outside the opening 32 of the leg piece 12 such that the lock teeth 64 opposes the lock pawl 66. When the lock plates 44 moves in the direction in which the diameter increases, the lock pawl 66 in a separate state is meshed with the lock teeth 64, so that the shaft 30 is prevented from being rotated in the webbing drawing direction. The lock pawl 66 and the lock teeth 64 constitute a lock means.

A press plate 48 is fitted on the tip portion of the projection shaft 40, and the press plate 48 is rotated together with the shaft 30. Between the press plate 48 and the V gear 42, a torsion coil spring 50 is fitted on the projection shaft 40. One end 52 of the torsion coil spring 50 is locked into the V gear 42, and the other end 54 of the torsion coil spring 50 is locked to the press plate 48. The torsion coil spring 50 biases the V gear 42 to rotate the V gear 42 together with the shaft 30.

V teeth 56 serving as external teeth are formed in the outer periphery of the V gear 42, and an acceleration sensor 58 is arranged on the leg piece 12 below the V gear 42 such that the acceleration sensor 58 opposes the V teeth 56. In the acceleration sensor 58, when an inertia ball 60 is accelerated with vehicle sudden deceleration to inertially move to the front of the vehicle, a V pawl 62 is pivoted from a solid-line position to a chain-line position in FIG. 2 to be meshed with the V teeth 56 of the V gear 42, thereby preventing the V gear 42 from being rotated in the webbing drawing direction.

The other end portion of the shaft 30 extends out of the leg piece 14, a flat spiral spring (not shown) is arranged on the extended end portion, and the flat spiral spring biases the shaft 30 to rotate the shaft 30 in the webbing taking-up direction.

Figure 5:
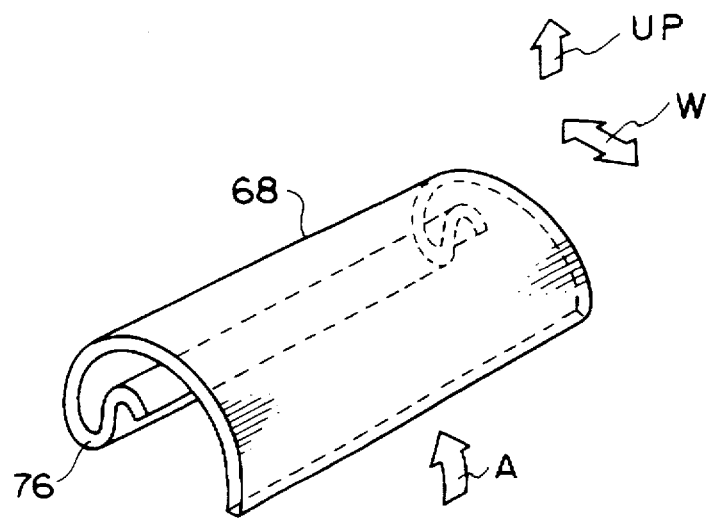
FIG. 5 is a perspective view showing a plate-like member in the webbing take-up device according to the first embodiment.

As shown in FIG. 6, a cavity portion 67 is formed between the spool 22 and the shaft 30. The cavity portion 67 extends to have a dimension slightly smaller than the axial dimension of the spool 22, and is formed within a predetermined angular range. An EA plate 68 (plate-like member (energy absorbing member)) is arranged in the cavity portion 67 internal-angle portions 70 and 72 are formed at both the ends of the cavity portion 67 in the peripheral direction of the cavity portion 67. The EA plate 68 is arranged in the following manner. That is, one end of the EA plate 68 is inserted and locked into a plate locking groove 74 formed on the outer peripheral surface of the shaft 30, the intermediate portion of the EA plate 68 is bent to have a U-shaped portion 76 having a bottom being in contact with one internal-angle portion 70, and the other end of the EA plate 68 is brought into contact with the other internal-angle portion 72. Note that the one-end side of the EA plate 68 from the U-shaped portion 76 is brought into contact with the outer peripheral surface of the shaft 30, and the other-end side of the EA plate 68 is brought into contact with the inner peripheral surface of the spool 22. The shape of the EA plate 68 before the EA plate 68 is wound around the shaft 30 (before deformation) is shown in FIG. 5.

When the shaft 30 is prevented from being rotated in the webbing drawing direction, and the webbing drawing force applies a torque to the spool 22 in the webbing drawing direction with reference to the shaft 30, the other end of the EA plate 68 is pressed by the internal-angle portion 72. In this manner, while the spool 22 is rotated in the webbing drawing direction (an arrow A) with reference to the shaft 30, the EA plate (68 is wound around the outer periphery of the shaft 30. At this time, before the EA plate 68 is wound around the shaft 30, the EA plate 68 must be plastically bent at the U-shaped portion 76 (not necessarily limited to plastically). The plastic deforming force generated when the EA plate 68 is plastically deformed corresponds to a force required when the spool 22 is rotated in the webbing drawing direction with reference to the shaft 30.

When the shaft 30 can be freely rotated without being prevented from being rotated in the webbing drawing direction, the EA plate 68 maintains its original shape, and is rotated together with the shaft 30.

Figure 7:
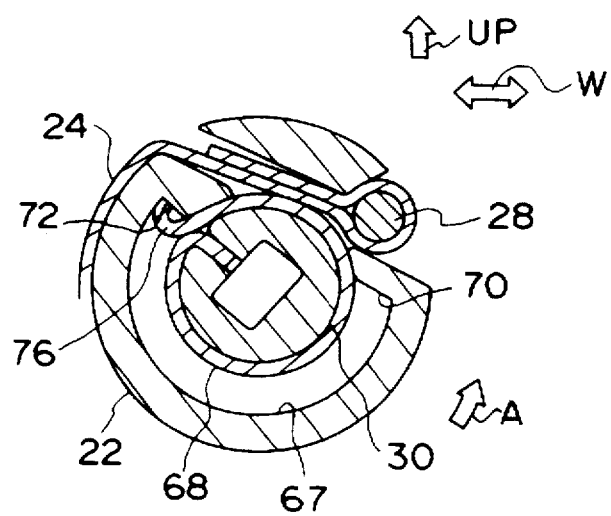
FIG. 7 shows a state wherein the plate-like member is wound around the shaft, and the spool is rotated in the webbing drawing direction with reference to the shaft, and is a view corresponding to FIG. 6.

The distances between the shaft 30 and the internal-angle portions 70 and 72 are short to be equal to gaps (78 and 80) corresponding to the wall thicknesses of the EA plate 68. When the EA plate 68 is wound around the outer periphery of the shaft 30 to form one layer, as shown in FIG. 7, the other end portion of the EA plate 68 is in the middle of bending before the EA plate 68 is wound around the shaft 30, and the other end portion is brought into contact with the winding start end of the EA plate 68 and pushed into the internal-angle portion 72. Subsequently, the spool 22 is prevented from being rotated in the webbing drawing direction with reference to the shaft 30. In this manner, a stopper means for regulating an amount of rotation of the spool, 22 in the webbing drawing direction with reference to the shaft 30 is formed.

Figure 4:
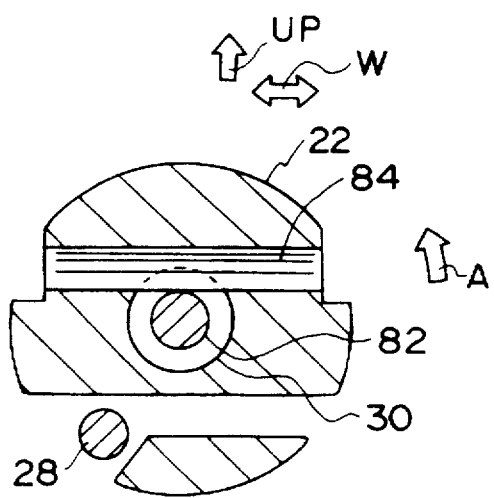
FIG. 4 is a view showing the webbing take-up device along a 4—4 line in FIG. 1.

As shown in FIG. 4, an annular groove 82 is formed in the other end portion of the shaft 30, and a bar 84 traversing in the annular groove 82 in the direction perpendicular to the axial direction to be engaged with the annular groove 82 is formed in the spool 22. Therefore, although the spool 22 can be allowed to be rotated with reference to the shaft 30, the spool 22 is prevented from moving in the axial direction relatively with reference to the shaft 30.

A function of the first embodiment of the present invention will be described below.

In an ordinary state, the EA plate 68 keeps its original shape, the shaft 30 and the spool 22 are rotated together with each other, and the webbing 24 can be freely drawn and taken up.

When the lock pawl 66 is meshed with the lock teeth 64 in the vehicle sudden deceleration, and the lock means operates to prevent the shaft 30 from being rotated in the webbing drawing direction, the drawing force of the webbing 24 applies to the spool 22 a torque in the webbing drawing direction with reference to the shaft 30. In this manner, the EA plate 68 cannot keep its original shape to be deformed, and, with rotation of the spool 22 in the webbing drawing direction with reference to the shaft 30, the EA plate 68 is pushed by the internal-angle portion 72 of the spool 22 to be wound around the outer periphery of the shaft 30.

When the other end portion of the EA plate 68 is pushed into the internal-angle portion of the spool at the winding start end of the EA plate 68 around the shaft 30 to be placed into a so-called constipation state, the subsequent rotation of the spool in the webbing drawing direction with reference to the shaft is prevented. Subsequently, the webbing 24 is prevented from being drawn. When the webbing is prevented from being drawn, energy is absorbed by drawing the webbing 24 by a predetermined length.

Thus, the EA plate 68 is interposed between the spool and the shaft, and is deformed with rotation of the spool 22 in the webbing drawing direction with reference to the shaft 30, and the spool 22 need not move in the axial direction. Therefore, the device can be decreased in size.

In this case, the EA plate 68 must be plastically bent before the EA plate 68 is wound around the shaft 30, and the plastic bending force mainly corresponds to a force required to rotate the spool 22 in the webbing drawing direction with reference to the shaft 30. The bending plastic deformation (folding-back) of the EA plate 68 which is subjected to bending stabilize a load in the process of deformation, and a stable load can be achieved with small deformation.

EA plate 68 can be incorporated in the spool 22 between the shaft 30 and the spool 22, and the device can be miniaturized (to be compact).

A second embodiment will be described below with reference to FIGS. 8 to 10.

This embodiment is different from the first embodiment mainly in stopper means.

Figure 10:
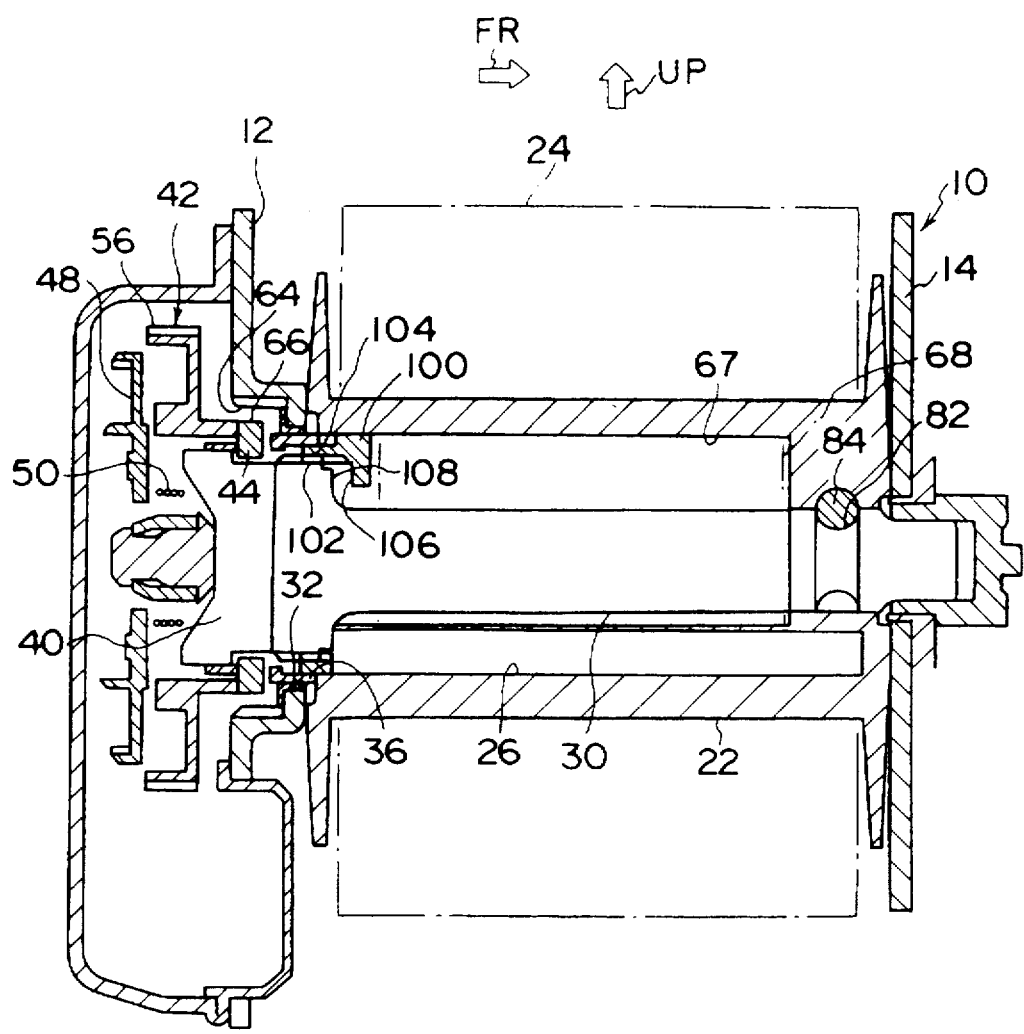
FIG. 10 is i view showing the webbing take-up device according to the second embodiment and corresponding to FIG. 1.

In the stopper means according to the second embodiment, as shown in FIG. 10, the outer periphery of a nut 100 is fitted on the inner periphery of a spool 22 at one end of the spool 22, and in correspondence with a female screw portion 102 of the nut 100, a male screw portion 104 meshed with the female screw portion 102 is formed on the outer periphery of a shaft 30 (the female screw portion 102 of the nut 100 and the male screw portion 104 of the shaft 30 constitute a screw mechanism constituting a moving means). A projection 106 (moving member) extends inward from the nut 100 in the radial direction, and a step surface 108 (regulating means) is formed on the shaft 30 such that the step surface 108 opposes the projection 106 in the axial direction of the spool 22 and the shaft 30. The nut 100 is rotated integrally with the spool 22, and can move relative to the spool 22 in the axial direction. In an ordinary state in which the spool 22 and the shaft 30 are rotated together with each other, the nut 100 is also rotated together therewith, and an amount of meshing between the female screw portion 102 of the nut 100 and the male screw portion 104 of the shaft 30 is maintained constant. When the spool 22 is rotated in the webbing drawing direction with reference to the shaft 30 and EA plate 68 is deformed, the nut 100 is rotated relatively to the shaft 30. The amount of meshing between the female screw portion 102 of the nut 100 and the male screw portion 104 of the shaft 30 increases, and the projection 106 of the nut 100 moves toward the step surface 108 of the shaft 30 in the axial direction of the spool 22 and the shaft 30. When the projection 106 of the nut 100 is brought into tight contact with the step surface 108 of the shaft 30, subsequent rotation of the spool 22 in the webbing drawing direction with reference to the shaft 30 is prevented. As far as the nut 100 moves between a separate position where the projection 106 of the nut 100 is separated from the step surface 108 and a contact position where the projection 106 of the nut 100 is brought into contact with the step surface 108, the spool 22 is allowed to be rotated in the webbing drawing direction with reference to the shaft 30.

Figure 8:
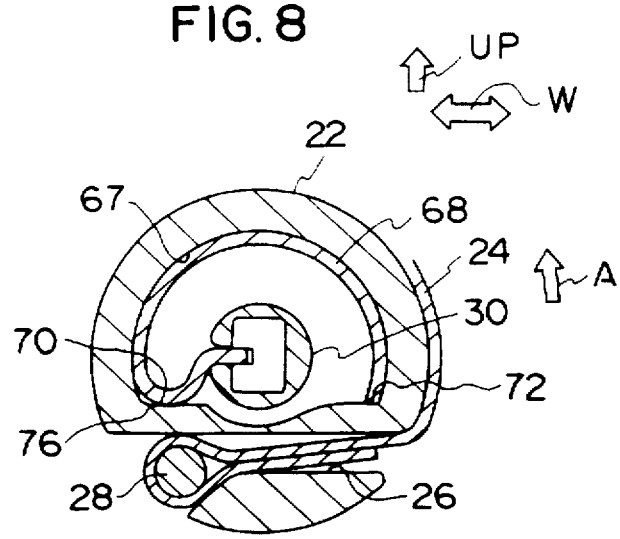
FIG. 8 is a view (corresponding to FIG. 6 in a webbing take-up device according to a second embodiment.
Figure 9:
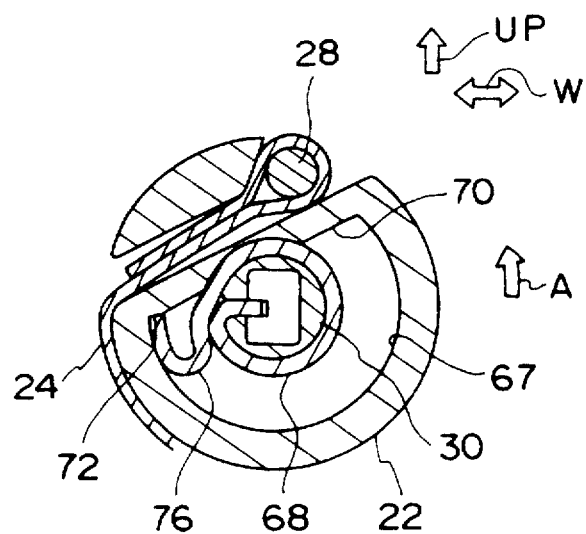
FIG. 9 is a view corresponding to FIG. 7 in the webbing take-up device according to the second embodiment.

With rotation of the spool 22 in the webbing drawing direction with reference to the shaft 30, a EA plate 68 having the original shape in FIG. 8 is deformed to be wound around the shift 30 as shown in FIG. 9. At a time when the EA plate 68 still has a U-shaped portion 76, the projection 106 of the nut 100 is brought into contact with the step surface 108 of the shaft 30 so as to stop rotation of the spool 22 in the webbing drawing direction with reference to the shaft 30.

The other arrangements and functional effects of the second embodiment are the same as those of the first embodiment.

Figure 11:
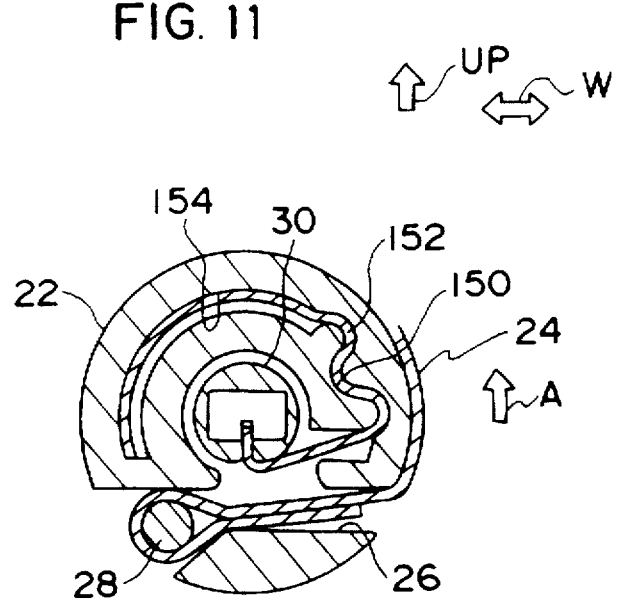
FIG. 11 is a view corresponding to FIG. 6 in a webbing take-up device according to a third embodiment.
Figure 12:
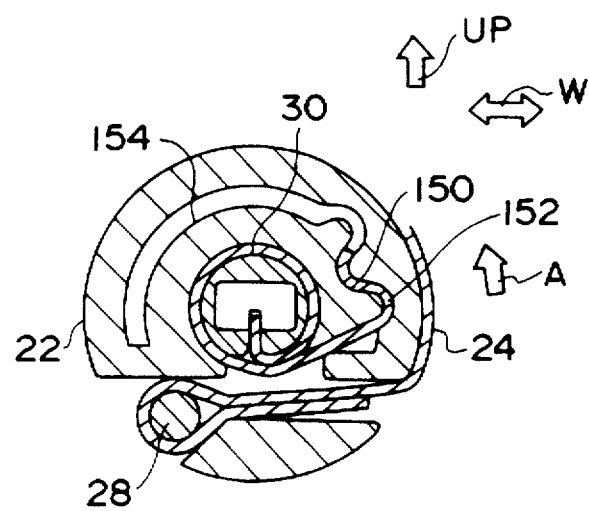
FIG. 12 is a view corresponding to FIG. 7 in the webbing take-up device according to the third embodiment.

A third embodiment will be described below with reference to FIGS. 11 to 13.

According to this embodiment, in order to bend an EA plate 152 before the EA plate 152 is wound around a shaft 30, a winding path 150 is formed in the wall thickness of a spool 22. The winding path 150 has a size corresponding to the wall thickness of an EA plate 152. A circular path 154 which is slightly larger than the winding path 150 and coaxial with respect to the spool 22 is formed on the back side of the winding path 150 in the wall thickness of the spool 22. The EA plate 152 is disposed over the winding path 150 and the circular path 154 from one terminal locked into the shaft 30 to the other end on the opposite side. The EA plate 152 ordinarily keeps its original shape as shown in FIG. 11, and rotate the spool 22 and the shaft 30 together with each other. When a webbing 24 is drawn while the spool 22 is prevented from being rotated in the webbing drawing direction, as shown in FIG. 12, the tensile or drawing force of the webbing 24 causes a portion of the winding path 150 of the spool 22 to push the EA plate 152, and the EA plate 152 is deformed. With rotation of the spool 22 in the webbing drawing direction with reference to the shaft 30, the EA plate 152 passes through the winding path 150 to be wound around the shaft 30 between the inner peripheral surface of the spool 22 and the shaft 30.

Figure 13:
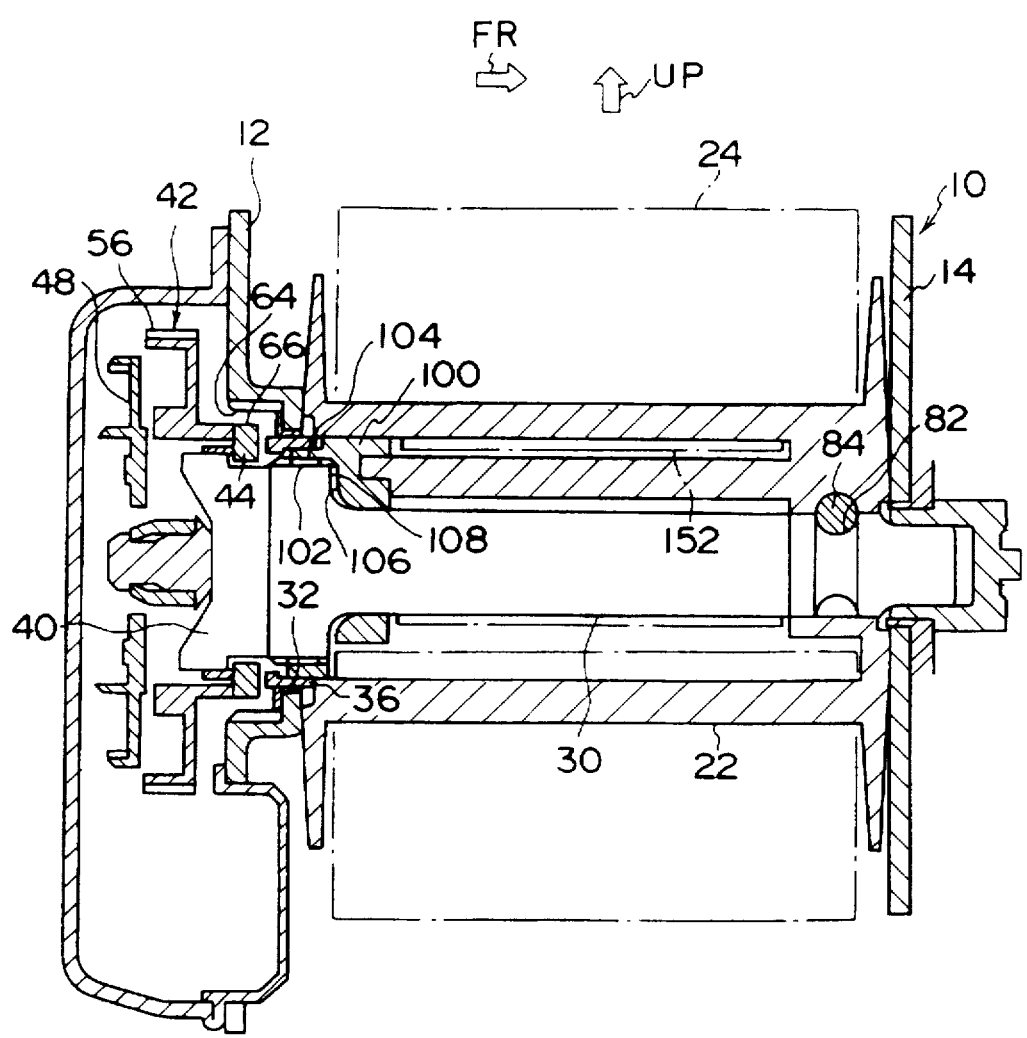
FIG. 13 is a view showing the webbing take-up device according to the third embodiment and corresponding to FIG. 1.

Note that, as shown in FIG. 13, a stopper means for regulating an amount of rotation of the spool 22 in the webbing drawing direction with reference to the shaft 30 is the same as the stopper means according to the-second embodiment. Although the EA plate 152 is wound around the shaft 30 with rotation of the spool 22 in the webbing drawing direction with reference to the shaft 30, a projection 106 of a nut 100 is brought into contact with a step surface 108 of the shaft 30 while the EA plate 152 is left in the winding path 150 so as to stop the rotation of the spool 22 in the webbing drawing direction with reference to the shaft.

When the EA plate 152 is plastically bent by the winding path 150, as in the first embodiment, a load required for rotation of the spool 22 in the webbing drawing direction with reference to the shaft 30 can be stabilized, and a rise time required to obtain the stable load can be shortened.

As in the first embodiment, the EA plate 152 can be incorporated in the spool 22 between the shaft 30 and the spool 22, and the device can be miniaturized.

The other arrangements and functional effects are the same as those of the first embodiment.

A fourth embodiment will be described below with reference to FIGS. 14 and 15.

According to this embodiment, in order to bend an EA plate 204 before the EA plate is wound around a shaft 30, a U-shaped path 200 is formed in the wall thickness of a spool 22. A circular path 202 which is coaxial with respect to a spool 22 is formed in the wall thickness of the spool 22 on the back side of the U-shaped path 200. The U-shaped path 200 and the circular path 202 have thicknesses almost equal to the wall thickness of an EA plate 204, and the EA plate 204 has the same shape as that of the EA plate 68 according to the first embodiment. The EA plate 204 is arranged over the U-shaped path 200 and the circular path 202 from one terminal locked into a shaft 30 to the other end on the opposite side.

Figure 14:
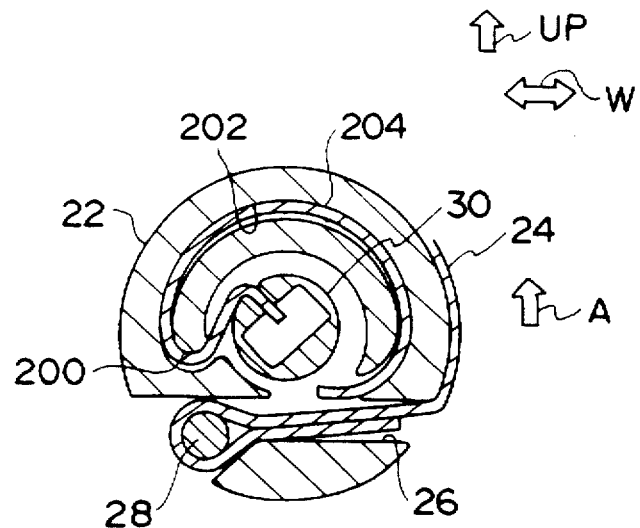
FIG. 14 is a view corresponding to FIG. 6 in a webbing take-up device according to a fourth embodiment.
Figure 15:
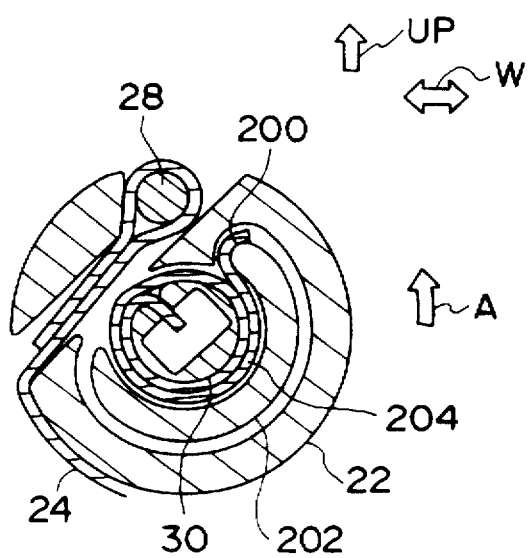
FIG. 15 is a view corresponding to FIG. 7 in the webbing take-up device according to the fourth embodiment.

The EA plate 204 ordinarily keeps its original shape as shown in FIG. 14, and rotate the spool 22 and the shaft 30 together with each other. When a webbing 24 is drawn while the shaft 30 is prevented from being rotated in the webbing drawing direction, as shown in FIG. 15, the tensile or drawing force of the webbing 24 causes a portion of the U-shaped path 200 of the spool 22 to push the EA plate 204, and the EA plate 204 is deformed. With rotation of the spool 22 in the webbing drawing direction with reference to the shaft 30, the EA plate 204 passes through the U-shaped path 200 to be wound around the shaft 30 between the inner peripheral surface of the spool 22 and the shaft 30.

The other arrangements and functional effects are the same as those of the third embodiment.

Note that, in a stopper means, the spool 22 is prevented from being rotated in the webbing drawing direction with reference to the shaft 30 while the EA plate 204 is left in the U-shaped path 200.

Figure 16:
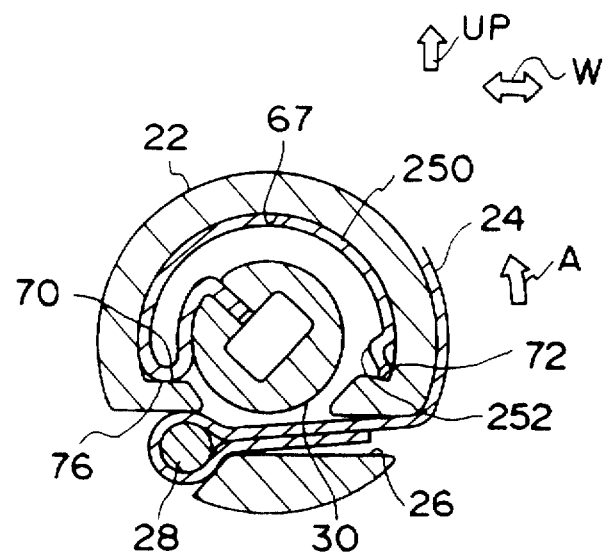
FIG. 16 is a view corresponding to FIG. 6 in a webbing take-up device according to a fifth embodiment.
Figure 17:
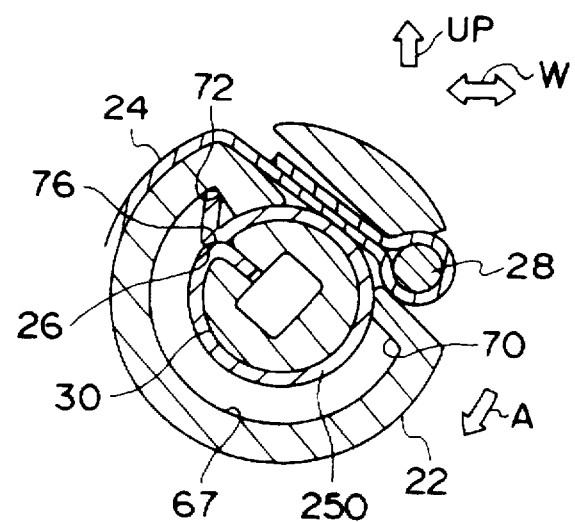
FIG. 17 is a view corresponding to FIG. 7 in the webbing take-up device according to the fifth embodiment.

A fifth embodiment will be described below with reference to FIGS. 16 and 17.

According to this embodiment, an EA plate 250 has the same shape as that of the EA plate 68 of the first embodiment. However, as shown in FIG. 16, the other end portion of the EA plate 250 on the side opposite to one end locked into a shaft 30 is knocked to be bent onto the shaft side to have a V shape (a V-shaped portion 252).

When a webbing 24 is drawn while the shaft 30 is prevented from being rotated in a webbing drawing direction, a spool 22 is rotated in the webbing drawing direction with reference to the shaft 30 in such a manner that the EA plate 250 is deformed from a position (position shown in FIG. 16) where the EA plate 250 keeps its original shape to be wound around the shaft 30. In order to regulate an amount of rotation of the spool in the webbing drawing direction with reference to the shaft, as shown in FIG. 17, the other end portion of the EA plate 250 is pushed into an internal-angle portion 72 of the spool 22 at the winding start end portion of the EA plate 250 around the shaft 30. In this case, the amount of rotation of the spool 22 in the webbing drawing direction with reference to the shaft 30 can be accurately regulated.

Figure 18:
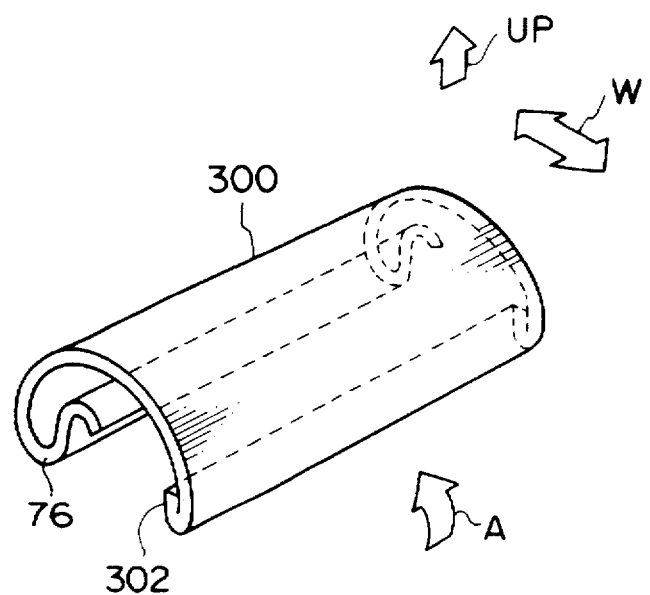
FIG. 18 is a view corresponding to FIG. 5 in a webbing take-up device according to a sixth embodiment.
Figure 19:
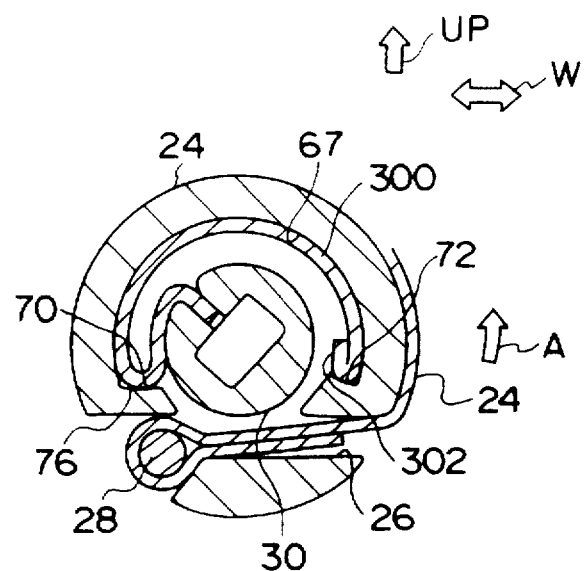
FIG. 19 is a view corresponding to FIG. 6 in the webbing take-up device according to the sixth embodiment.
Figure 20:
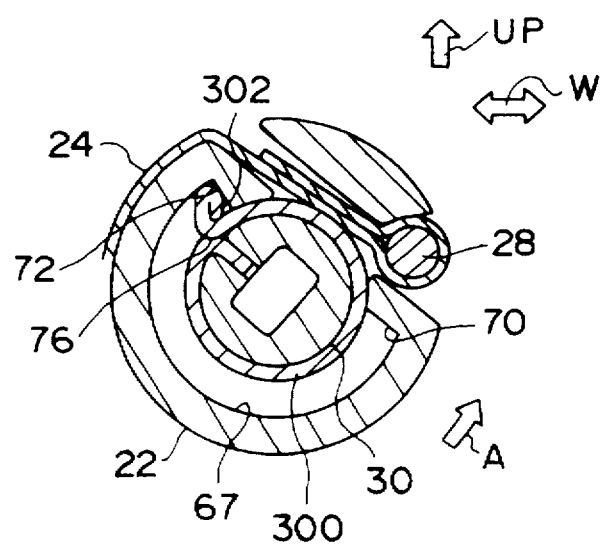
FIG. 20 is a view corresponding to FIG. 7 in the webbing take-up device according to the sixth embodiment.

In order to bend the other end portion of the EA plate toward the shaft 30 side, a sixth embodiment shown in FIGS. 18 to 20 is also possible.

According to the sixth embodiment, as shown in FIGS. 18 and 19, the other end portion of an EA plate 300 is bent toward the shaft side to have a U shape (a U-shaped portion 302).

According to this embodiment, when a webbing 24 is drawn while the shaft 30 is prevented from being rotated in a webbing drawing direction, a spool 22 is rotated in the webbing drawing direction with reference to the shaft 30 in such a manner that the EA plate 300 is performed from a position (position shown in FIG. 19) where the EA plate 300 keeps its original shape to be wound around the shaft 30. When the other end portion of the EA plate 300, as shown in FIG. 20, is pushed into an internal-angle portion 72 of the spool 22 at the winding start end portion of the EA plate 300 around the shaft 30, an amount of rotation of the spool 22 in the webbing drawing direction with reference to the shaft 30 can be accurately regulated. These effects are the same as those of the fifth embodiment.

The other arrangements and functional effects of the fifth and sixth embodiments are the same as those of the first embodiment.

Figure 21:
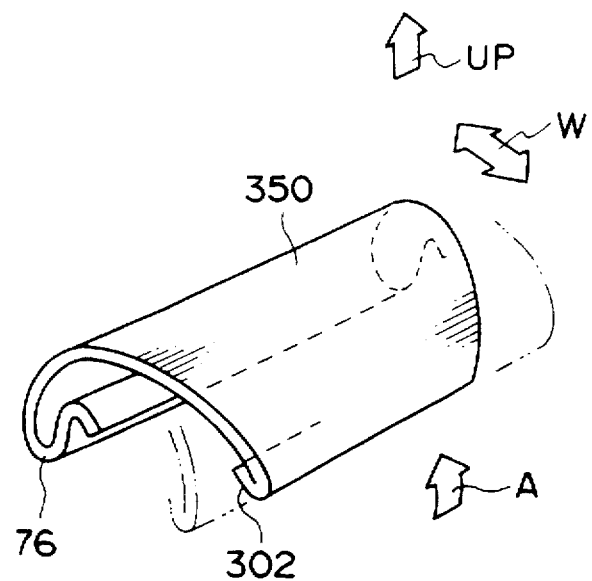
FIG. 21 is a view corresponding to FIG. 5 in a webbing take-up device according to a seventh embodiment.
Figure 23:
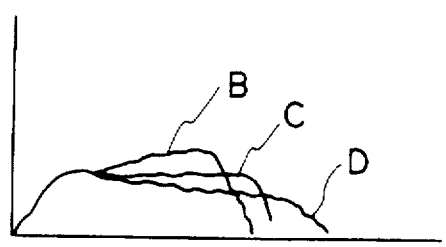
FIG. 23 is a graph showing the relationship between a load and an amount of taking-up to the shaft, with respect to the plate-like member.

A seventh embodiment will be described below with reference to FIGS. 21 and 23.

According to this embodiment, an EA plate 350 has the same shape as that of the EA plate 300 of the sixth embodiment. However, the EA plate 350 has a width gradually decreasing from one end locked into a shaft 30 to the other end (in FIG. 21, the outline of an EA plate not having such a decreasing width is indicated by a chain line), and the area of the EA plate 350 decreases.

In this case, unlike this embodiment, when the EA plate has a width which does not change from one end to the other end, and the area of the EA plate does not change, a frictional force generated by a reaction force of the EA plate between the EA plate and a spool 22 or the like in winding of the EA plate around the shaft 30 is proportional to an amount of winding of the EA plate around the shaft 30. Therefore, a load required to rotate the spool 22 in the webbing drawing direction with reference to the shaft 30 tends to increase with rotation of the spool 22 in the webbing drawing direction with reference to the shaft 30, as indicated by a curve B in the graph in FIG. 23 (a load required to rotate the spool 22 in the webbing drawing direction with reference to the shaft 30 is plotted as an abscissa, and an amount of rotation of the spool 22 in the webbing drawing direction with reference to the shaft 30 is plotted as an ordinate).

As described in this embodiment, when the area of the EA plate 350 is gradually decreased from one end to the other end, the frictional force generated by the reaction force of the EA plate 350 between the EA plate 350 and the spool 22 or the like can be prevented from increasing even if the amount of winding of the EA plate 350 around the shaft 30 increases.

Therefore, the load required to rotate the spool 22 in the webbing drawing direction with reference to the shaft 30 can be stabilized (indicated by a curve c in the graph in FIG. 23) or gradually decreased (indicated by a curve D in the graph in FIG. 23) in the process of rotating the spool 22 in the webbing drawing direction with reference to the shaft 30.

Figure 22:
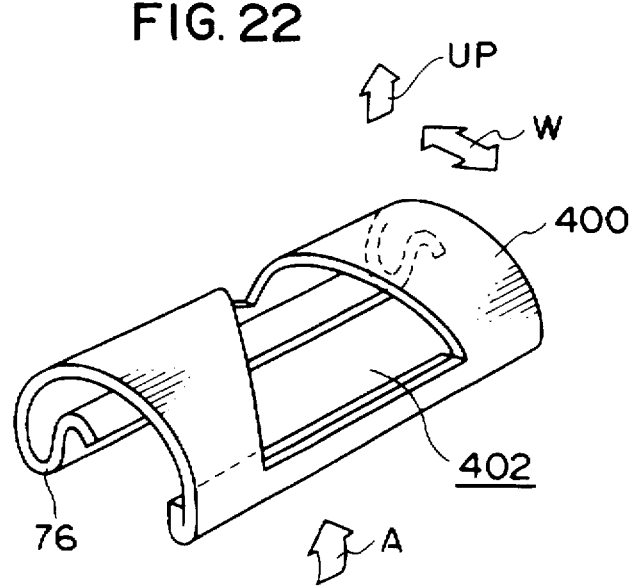
FIG. 22 is a view corresponding to FIG. 5 in the webbing take-up device according to an eighth embodiment.

In order to gradually decrease the area of the EA plate from one end to the other end, an eighth embodiment shown in FIG. 22 can also be used.

According to the eighth embodiment, an opening having a width gradually increasing from one end to the other end is formed in an EA plate 400. According to this embodiment, the same functional effect as that of the seventh embodiment can be obtained.

The other arrangements and functional effects of the seventh and eighth embodiments are the same as those of the sixth embodiment.

In the seventh or eighth embodiment, the area of the EA plate is changed such a manner that the area is decreased from one end to the other end. However, as in an eleventh embodiment shown in FIG. 31, a portion 502 whose width and area gradually decrease may be formed between one end and the other end of an EA plate 500 to change the area of the EA plate from one end to the other end of the EA plate.

Figure 31:
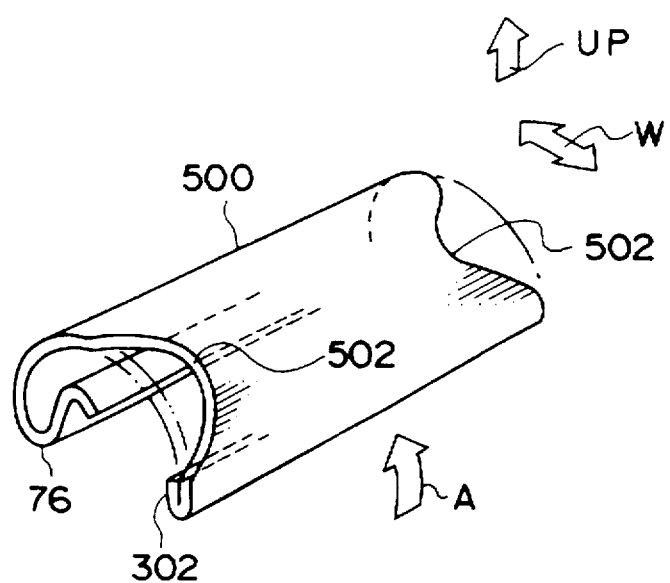
FIG. 31 is a view corresponding to FIG. 5 in the webbing take-up device according to an eleventh embodiment.

More specifically, in consideration of the EA plate 500 before deformation shown in FIG. 31, each of both the end portions of the EA plate 500 in the direction of the width of the EA plate 500 is circularly notched from the rear side of U-shaped portion 76 to the other end of the EA plate 500 to decrease the width of the EA plate 500 (in FIG. 31, the outline of an EA plate which does not have such a small-width portion is indicated by a chain line), and the EA plate 500 has the original width at the other end portion of the EA plate 500 in this manner, a frictional force (explained in the seventh embodiment) generated by a reaction force of the EA plate 500 between the EA plate 500 and a spool 22 or the like can be adjusted in the process of rotating the spool in the webbing drawing direction with reference to the shaft, and a load required to rotate the spool in the webbing drawing direction with reference to the shaft can be reduced in a part of the process of rotating the spool in the webbing drawing direction with reference to the shaft.

The other arrangements and functional effects of the eighth embodiment are the same as those of the sixth embodiment.

Figure 26:
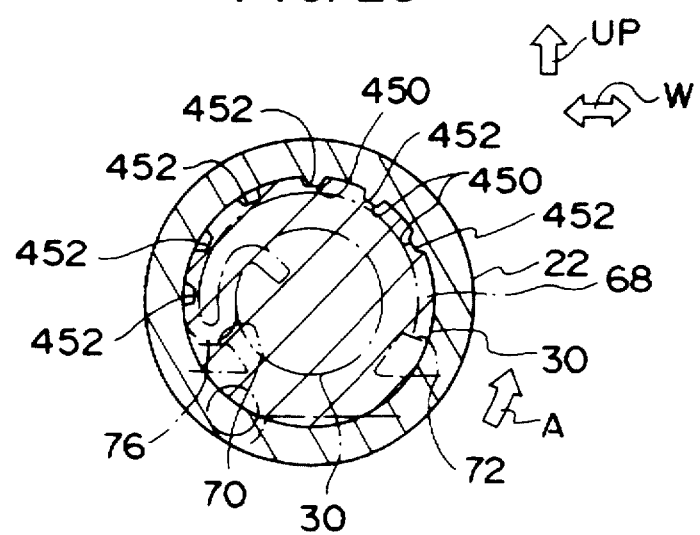
FIG. 26 is a view corresponding to FIG. 24 in a webbing take-up device according to a ninth embodiment.
Figure 27:
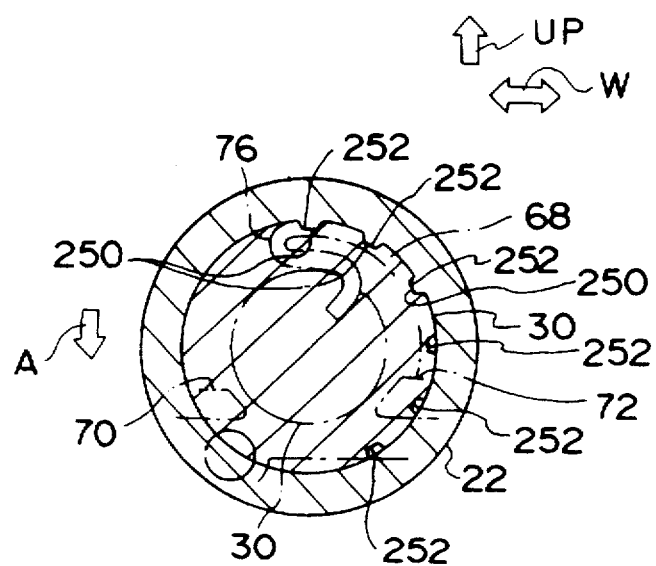
FIG. 27 is a view corresponding to FIG. 25 in a webbing take-up device according to the ninth embodiment.

A ninth embodiment will be described below with reference to FIGS. 26 and 27.

According to this embodiment, a projecting portion 450 is formed on the inner peripheral surface of a spool 22 at one end portion of a spool 22, and a recessed portion 452 fitted on the projecting portion 450 is formed on the outer peripheral surface of the shaft 30. The projecting portion 450 is briskly formed. In general, Fitting between the projecting portion 450 and the recessed portion 452 prevents the spool 22 from being rotated with respect to the shaft 30. However, when a webbing is drawn while the shaft 30 is prevented from being rotated in a webbing drawing direction to cause a EA plate 68 to be deformed, and the spool 22 is to be rotated in the webbing drawing direction with reference to the shaft 30, the projecting portion 450 is ruptured to allow the spool 22 to rotate in the webbing drawing direction with reference to the shaft 30.

A plurality of projecting portions 450 are arranged in the peripheral direction at intervals, and a plurality of recessed portions 452 are arranged in the peripheral direction at intervals. When the combination of the projecting portion 450 and the recessed portion 452 is changed, a plurality of relative rotation positions can be set between the spool 22 and the shaft 30. In this embodiment, three projecting portions 450 and six recessed portions 452 (twice the number of the projecting portions 450) are arranged at equal pitches.

In an arrangement in which the other end of the EA plate 68 is located in an internal-angle portion 72 of the spool 22, in order to arrange the EA plate 68 at a predetermined position between the spool 22 and the shaft 30, the shaft 30 and the spool 22 must be aligned to each other around the axis. Therefore, the spool 22 and the shaft 30 are aligned to each other such that the projecting portions 450 rind the recessed portion 452 are fitted on each other. In rotation of the spool 22 in the webbing drawing direction with reference to the shaft 30, the projecting portions 450 is ruptured by the torque of the spool 22, and the spool 22 can be rotated in the webbing drawing direction with reference to the shaft 30 without any failure.

In this case, if the constitution in which the other end portion of the EA plate 68 is pushed into the internal-angle portion of the spool at the winding start end portion of the EA plate 68 around the shaft 30 is adopted, in order to regulate an amount of rotation of the spool 22 in the webbing drawing direction with reference to the shaft 30, the amount of rotation of the spool 22 in the webbing drawing direction with reference to the shaft 30 corresponds to the length of the EA plate 68. Depending on a desired amount of drawing of a webbing 24, the length of the EA plate 68 is set. Even if the EA plate 68 changes in length, the other end of the EA plate 68 must be located in the internal-angle portion 72.

Figure 24:
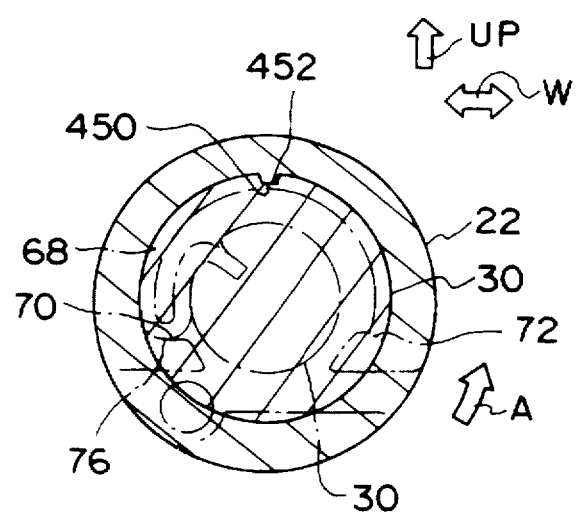
FIG. 24 shows alignment between the spool and the shaft around the axis, and is a view corresponding to the view along a 24—24 line in FIG. 1.
Figure 25:
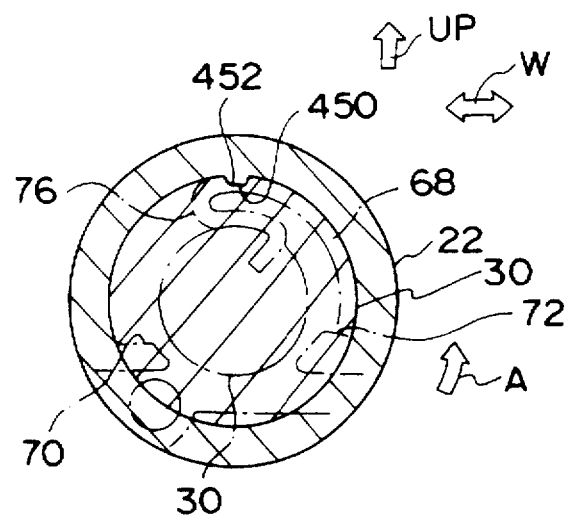
FIG. 25 is a view corresponding to FIG. 24 according to a plate-like member having a different length.

As shown in FIGS. 24 and 25, when a single projecting portion 450 and a single recessed portion 452 are used, it is only at one position where the spool 22 and the shaft 30 can be aligned to each other around the axis. Therefore, in order to make an alignment position in a case wherein an EA plate 68 (shown in FIG. 24) having a certain length is used, different from an alignment position in a case wherein another EA plate 68 (shown in FIG. 25) having a different length is used, a different spool 22 and a different shaft 30 must be arranged.

According to this embodiment, a combination of the projecting portion 450 and the recessed portion 452 in the case wherein an EA plate 68 having a certain length (shown in FIG. 26) is used, is made different from a combination of the projection portion 450 and the recessed portion 452 in the case wherein another EA plate 68 (shown in FIG. 27) having a different length is used to change the alignment position. Therefore, the same spool 22 and the same shaft 30 can be utilized.

In order to locate the other end of the EA plate 68 having the different length in the internal-angle portion 72, the alignment between the spool 22 and the shaft 30 can be performed at a plurality of positions depending on the length of the EA plate 68. In this case, the spool and the shaft can be commonly used in many arrangements.

Note that the formation positions of the projecting portion 450 and the recessed portion 452 may oppose the formation positions in this embodiment. More specifically, the projecting portion 450 may be formed on the shaft 30 side, and the recessed portion 452 may be formed on the spool 22 side.

The other arrangements and functional effects of the ninth embodiment are the same as those of the first embodiment.

Figure 29:
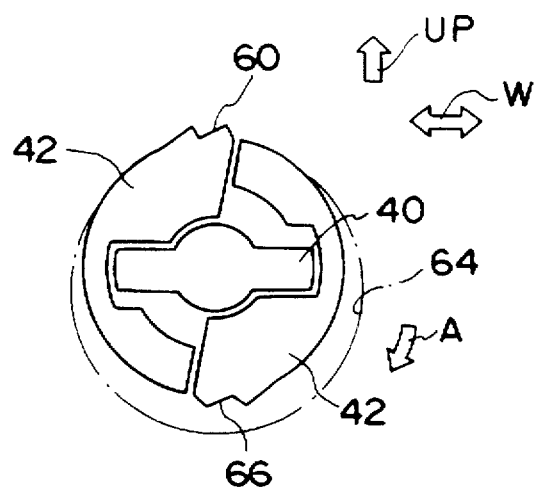
FIG. 29 is a view corresponding to FIG. 3 and showing a lock state of a shaft caused by movement of the shaft in the radial direction in a webbing take-up device according to a tenth embodiment.
Figure 30:
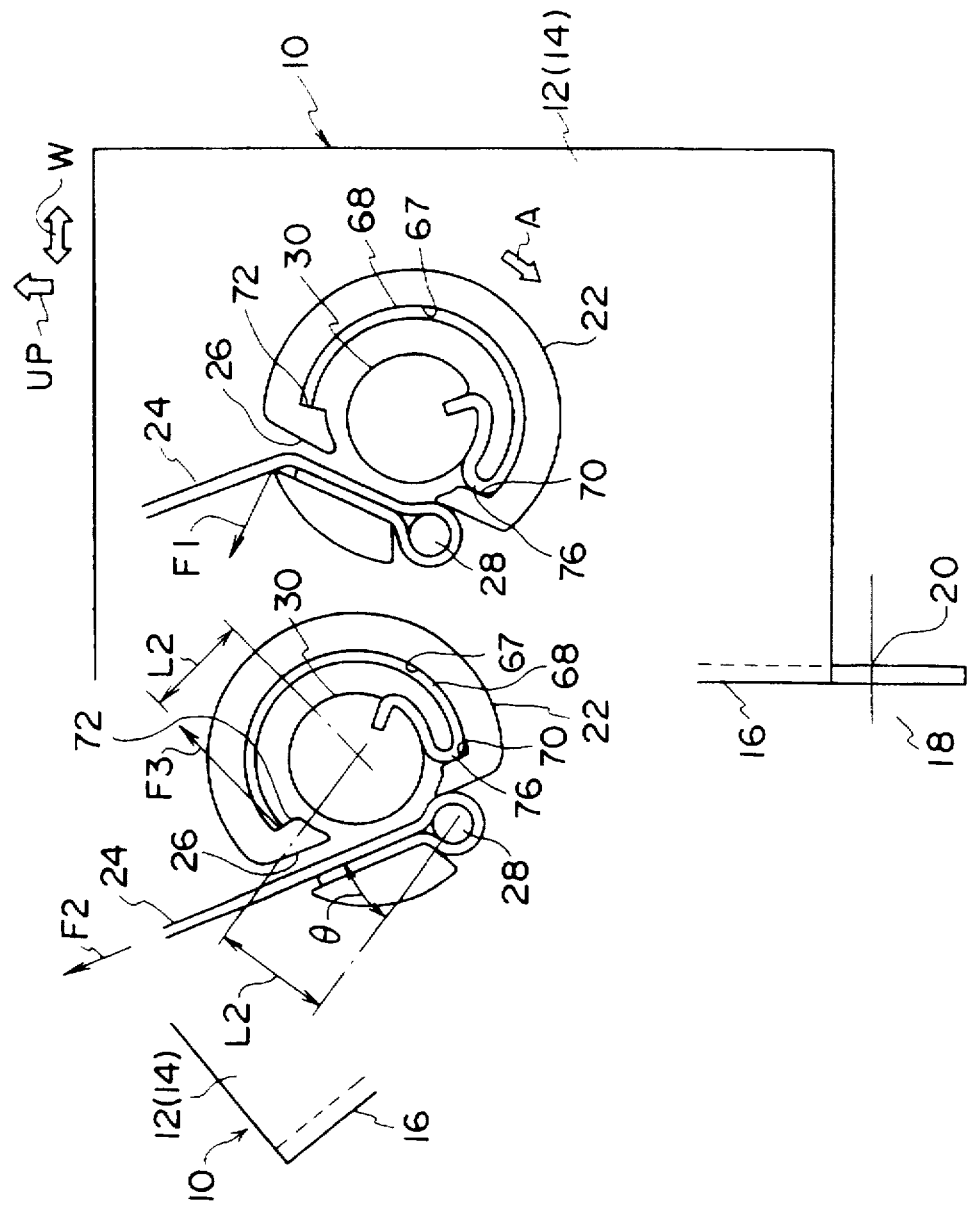
FIG. 30 is a view corresponding to FIG. 28 in the webbing take-tip device according to the tenth embodiment.

The tenth embodiment will be described below with reference to FIGS. 29 and 30.

According to this embodiment, when a webbing 24 is drawn upward in a full drawing state, an adapter 36 (support means, see FIG. 1) for supporting a shaft 30 in an opening 32 of a leg piece 12 of a frame 10 is ruptured. Due to this rupture, the shaft 30 moves upward together with the spool 22 in the direction (radial direction) perpendicular to the axial direction. With movement of the shaft 30, a lock plate 44 moves in the same direction, a lock pawl 66 is meshed with lock teeth 64 (shown in FIG. 29), and the shaft 30 is prevented from being rotated in the webbing drawing direction. Therefore, the shaft 30 is prevented from being rotated with reference to the frame 10.

When the webbing 24 is drawn in the full drawing state, the webbing tensile (drawing) force applies a torque to the frame 10 around a line which is parallel to the axis of the shaft 30 and the spool 22 and passes through a support point 20 between the frame 10 and a vehicle body 18. The adapter 36 is designed to be ruptured when the frame 10 is not rotated.

Figure 28:
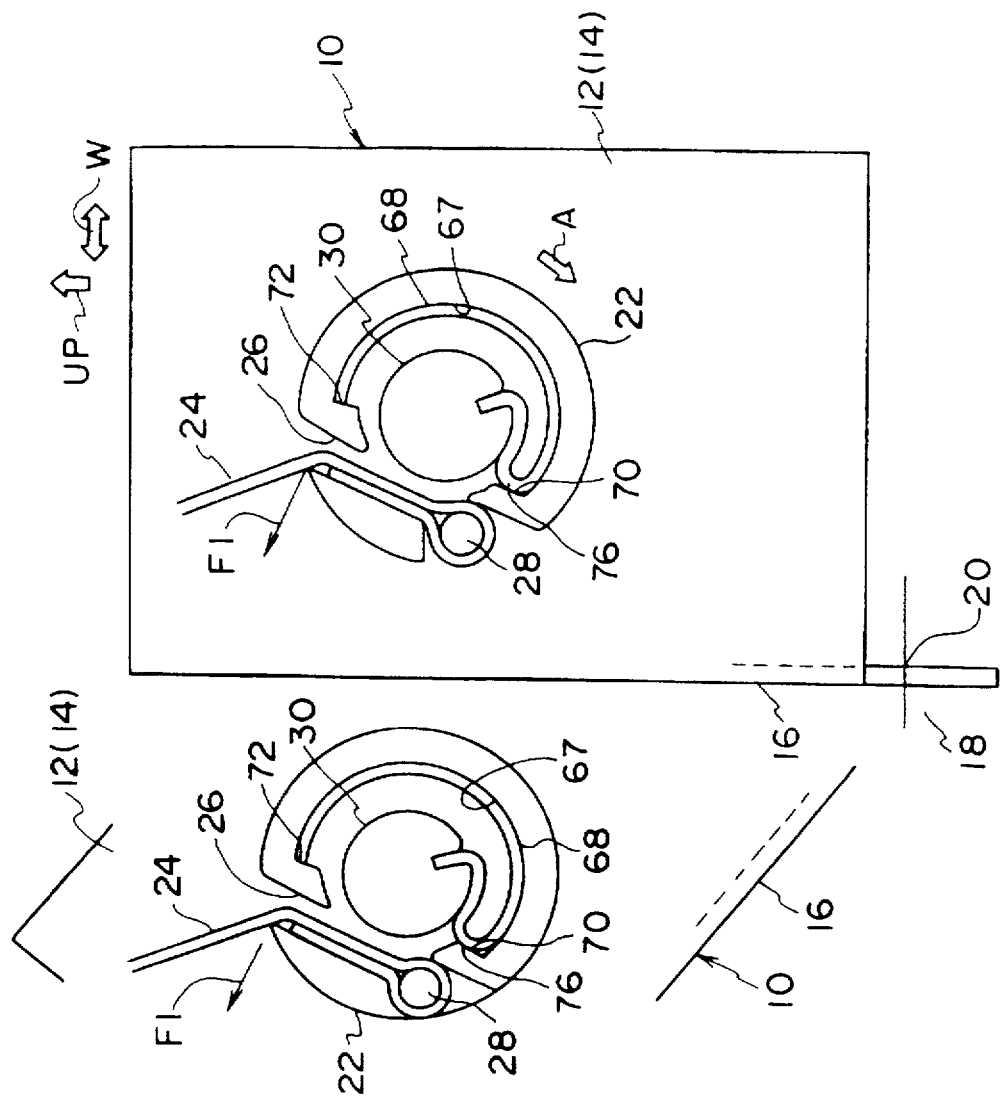
FIG. 28 is a view showing a webbing full drawing state with the relationship between the webbing and the frame when viewed from the axial direction of the shaft.

In this case, according to the arrangement in which the shaft 30 which can be coxially rotated with reference to the spool 22 is arranged in the spool 22, a stopper portion 28 of the webbing 24 to the spool 22 is located out of the axis of the spool 22 to assure a space for the stopper portion 28 in the wall thickness of the spool 22. In this case, as indicated in FIG. 28 by the ordinary posture of the frame 10 having a back piece 16 which is vertical, when the webbing 24 is drawn upward in the webbing full drawing state, the webbing 24 is bent through the outer peripheral surface of the spool 22 to have a V shape, and a load F1 acts on the spool 22 at the bending point of the spool 22 on the basis of the webbing drawing force.

When the spool 22 (together with the shaft 30) is kept freely rotated with reference to the frame 10, and the frame 10 is rotated to keep the balance between the frame and the webbing tensile (drawing) force (indicated in FIG. 28 as the posture of the frame 10 having the back piece 16 which is inclined from the vertical position), the spool 22 is rotated with reference to the frame 10 to keep the posture of the spool 22. The webbing 24 continues to be bent through the outer peripheral surface of the spool 22 to have a V shape. The load F1 is kept acting on the spool 22 at the bending point of the spool 22 on the basis of the webbing tensile (drawing) force.

According to this embodiment, a webbing drawing force which cannot rotate the frame 10 moves the shaft 30 in a direction (radial direction) perpendicular to the axial direction of the shaft 30, and the shaft 30 is prevented from being rotated in the webbing drawing direction. When the webbing tensile (drawing) force increases to rotate the frame 10 to keep the balance between the frame and the webbing tensile (drawing) force, the shaft 30 and the spool 22 are not rotated with reference to the frame 10, and the postures of the shaft 30 and the spool 22 are changed together with the frame 10. Therefore, although the webbing 24 is bent through the outer peripheral surface of the spool 22 to have a V shape before the frame 10 is rotated (indicated in FIG. 30 as the ordinary posture of the frame 10 having the back piece 16 which is vertical), after the frame 10 is rotated (indicated in FIG. 30 as the posture of the frame 10 having the back piece 16 which is inclined from the vertical position), unless the spool 22 is rotated with reference to the frame 10, the webbing 24 is straight through the outer peripheral surface of the spool 22. The load F1 acting on the spool 22 based on the webbing drawing force when the webbing 24 is bent through the outer peripheral surface of the spool 22 to have a V shape, vanishes.

In this case, a rotation moment M1 (M1 =F2 ×cos θ× arm length L1) acting on the spool 22 around the axis of the spool 22 based on a webbing drawing force F2 is in opposition to a rotation moment M2 (M2 =F3 ×arm length L2) acting on the spool 22 around the axis of the spool 22 in the internal-angle portion 72 of the spool 22 based on a deforming force F3 of the EA plate 68 required to rotate the spool 22 in the webbing drawing direction with reference to the shaft 30. As far as the rotation moment M1 is in opposition to the rotation moment M2, the spool 22 can hold its position such that the webbing 24 is straight without being bent through the outer peripheral surface of the spool 22 to have a V shape. Therefore, the load F1 acting on the spool based on the webbing drawing force is zero or reduced, and it suffices that the spool 22 has a proper strength.

The other arrangements and functional effects of the tenth embodiment are the same as those of the first embodiment.

Note that in the first aspect of the present invention the energy absorbing member is not limited to a plate like member. For example, as the energy absorbing member, a wire-like member or a member for performing screw cutting between the spool and the shaft with rotation of the spool in the webbing drawing direction with reference to the shaft can be used.

According to the webbing take-up device according to the first or second aspect of the present invention, the device can be miniaturized.

According to the webbing take-up device according to the third to twelfth aspects of the present invention, the load required to rotate the spool in the webbing drawing direction with reference to the shaft can be stabilized in the process of rotating the spool, or the load required to rotate the spool in the webbing drawing direction with reference to the shaft can be reduced in the process of rotating the spool. In addition, a stable load can be achieved with small deformation, and a compact device can be achieved.

While the embodiments of the present invention, as herein disclosed, constitute a preferred form, it is to be understood that other forms might be adopted.

We claim:

1. A webbing take-up device comprising:

a rotatably mounted spool having a cylinder with a cavity portion and which can freely draw and take up a webbing;

a shaft, rotatably arranged within the cavity portion of the cylinder of said spool, which can be freely rotated with reference to said spool, and a plate-like energy absorbing member completely contained within the cavity portion of the cylinder of said spool and having an inner end connected to said shaft and an outer end engaged with said spool, said plate-like member being wound around said shaft and keeping an original shape in an ordinary state to rotate said spool and said shaft together with each other, and, when said shaft is prevented from being rotated in a webbing drawing direction, said plate-like member being deformed by torsional forces generated by relative rotation between said spool and said shaft as a result of a webbing drawing force acting on said spool and being wound around said shaft.

2. A webbing take-up device according to claim 1, further comprising stopper means for regulating an amount of rotation of said spool in a webbing drawing direction with reference to said shaft.

3. A webbing take-up device comprising:

a cylindrical spool having an outer periphery which can freely draw and take up a webbing, and an inner periphery that defines a cavity portion;

a shaft having an outer periphery coaxially arranged in the cavity portion of said spool, which can be freely rotated relative to said spool;

lock means for preventing said shaft from being rotated in a webbing drawing direction, and a plate-like member completely contained within said cavity portion and arranged between said shaft and said spool and having a length that is substantially the same as the length of said shaft, having one end connected to said shaft and being spirally wound around the outer periphery of said shaft and having the other end engaged to the inner periphery of said spool and including a bent portion between said two ends, said plate-like member keeping an original shape in an ordinary state to rotate said spool and said shaft together with each other, and, when said shaft is prevented from being rotated in the webbing drawing direction, said plate-like member being deformed by torsional forces generated by a webbing drawing force acting on said spool and being wound around said shaft.

4. A webbing take-up device according to claim 3, in order to bend said plate-like member before said plate-like member is wound around said shaft, said plate-like member is arranged in said cavity-portion such that said plate-like member is bent to have a U shape, and the other end of said plate-like member is located in an internal-angle portion formed in said spool, and pushed in the internal-angle portion by rotation of said spool in the webbing drawing direction with reference to said shaft, to wind said plate-like member around said shaft.

5. A webbing take-up device according to claim 4, wherein the other end of said plate-like member is bent to protrude toward a shaft side.

6. A webbing take-up device according to claim 4, further comprising fitting means, arranged between said spool and said shaft and fitted on each other with a briskly fitting force, for making it possible to perform alignment between said spool and said shaft around the axis of said spool and said shaft and for, in order to locate the other end of said plate-like member in the internal-angle portion regardless of the length of said plate-like member, making it possible to perform alignment between said spool and said shaft at a plurality of positions depending on the length of said plate-like member.

7. A webbing take-up device according to claim 4, further comprising stopper means for regulating rotation of said spool in the webbing drawing direction with reference to said shaft, wherein said stopper means is arranged in such a manner that, when the other end of said plate-like member is bent before said plate-like member is wound around said shaft, the other end is brought into contact with a winding start end portion of said plate-like member to be pushed into the internal-angle portion of said spool, thereby preventing said spool from being rotated in the webbing drawing direction with reference to said shaft.

8. A webbing take-up device according claim 3, further comprising stopper means for regulating an amount of rotation of said spool in the webbing drawing direction with reference to said shaft, wherein said stopper means comprising:

a mobile member arranged between said spool and said shaft, which can move in the axial direction of said spool and said shaft, moving means for moving said mobile member with rotation of said spool in the webbing drawing direction with reference to said shaft, and regulating means for regulating an amount of movement of said mobile member to regulate an amount of rotation of said spool in the webbing drawing direction with reference to said shaft.

9. A webbing take-up device according to claim 3, wherein, in order to bend the plate-like member before said plate-like member is wound around said shaft, a winding path for making said plate-like member winding is formed in the wall thickness of said spool.

10. A webbing take-up device according to claim 3, wherein said plate-like member has an area which is gradually changed from one end of said plate-like member to the other end of said plate-like member.

11. A webbing take-up device according to claim 3, wherein, in order to bend said plate-like member before said plate-like member is wound around said shaft, a U-shaped path for causing said plate-like member to pass through said U-shaped path to have a U shape is formed in the wall thickness of said spool.

12. A webbing take-up device according to claim 3, further comprising:

a frame having a lower portion supported by and attached to a vehicle body and having an upper portion on which said shaft is supported, which, when said webbing is drawn upward from said spool, receives a torque around an axis parallel to the axial direction of said shaft and passing through a support point between the vehicle body and said frame in a webbing full drawing state;

said lock means constituted by lock teeth formed on said frame and a lock pawl formed on said shaft and engaged with said lock teeth to prevent rotation of said shaft in the webbing drawing direction; and rupture means interposed between said frame and said shaft, rupturing with a webbing drawing force which does not rotate said frame to move said shaft with reference to said frame in a direction perpendicular to the axial direction of said shaft together with said spool, thereby engaging said lock pawl with said lock teeth.

13. A webbing take-up device comprising:

a cylindrical spool having a cavity portion and which can freely draw and take up a webbing;

a shaft, coaxially arranged within the cavity portion of the spool, which can be freely rotated with reference to said spool;

lock means for preventing said shaft from being rotated in a webbing drawing direction;

a plate-like member arranged completely within the cavity portion of the spool and having a length that is substantially the same as the length of said shaft, having opposite ends engaged between said shaft and said spool and being hectically wound around the outer periphery of said shaft between an inner periphery of said spool and an outer periphery of said shaft, said plate-like member keeping an original shape in an ordinary state to rotate said spool and said shaft together with each other, and, when said shaft is prevented form being rotated in the webbing drawing direction, said plate-like member being deformed by a webbing drawing force acting on said spool and being wound around said shaft, and stopper means for regulating an amount of rotation of said spool in a webbing drawing direction with reference to said shaft.

14. A webbing take-up device according to claim 13, wherein in order to bend said plate-like member before said plate-like member is wound around said shaft, said plate-like member is arranged in said cavity portion such that said plate-like member is bent to have a U shape, and one end of said plate-like member is located in an internal-angle portion formed in said pool, and pushed in the internal-angle portion by rotation of said spool in the webbing drawing direction with reference to said shaft, to wind said plate-like member around said shaft.

15. A webbing take-up device according to claim 14, wherein said stopper means is arranged in such a manner that, when one end of said plate-like member is bent before said plate-like member is wound around said shaft, the other end is brought into contact with a winding start end portion of said plate-like member to be pushed into the internal-angle portion of said spool, thereby preventing said spool from being rotated in the webbing drawing direction with reference to said shaft.

16. A webbing take-up device according to claim 14, wherein one end of said plate-like member is bent to protrude toward a shaft side.

17. A webbing take-up device according to claim 13, wherein, in order to bend the plate-like member before said plate-like member is wound around said shaft, a winding path for making said plate-like member winding is formed in the wall thickness of said spool.

18. A webbing take-up device according claim 13, wherein said stopper means comprising:

a mobile member arranged between said spool and said shaft, which can move in the axial direction of said spool and said shaft, moving means for moving said mobile member with rotation of said spool in the webbing drawing direction with reference to said shaft, and regulating means for regulating an amount of movement of said mobile member to regulate an amount of rotation of said spool in the webbing drawing direction with reference to said shaft.

19. A webbing take-up device according to claim 13, wherein, in order to bend said plate-like member before said plate-like member is wound around said shaft, a U-shaped path for causing said plate-like member to pass through said U-shaped path to have a U shape is formed in the wall thickness of said spool.

20. A webbing take-up device according to claim 13, wherein said plate-like member has an area which is gradually changed from one end of said plate-like member to the other end of said plate-like member.

* * * * *